United States Patent
Gorski et al.

(10) Patent No.: US 11,775,569 B2
(45) Date of Patent: *Oct. 3, 2023

(54) OBJECT-BACKED BLOCK-BASED DISTRIBUTED STORAGE

(71) Applicant: Amazon Technologies, Inc., Seattle, WA (US)

(72) Inventors: Christopher Albert Gorski, Washington, DC (US); Nicholas Scott Branker, Raleigh, NC (US)

(73) Assignee: Amazon Technologies, Inc., Seattle, WA (US)

( * ) Notice: Subject to any disclaimer, the term of this patent is extended or adjusted under 35 U.S.C. 154(b) by 1511 days.

This patent is subject to a terminal disclaimer.

(21) Appl. No.: 15/583,921

(22) Filed: May 1, 2017

(65) Prior Publication Data
US 2017/0235818 A1    Aug. 17, 2017

Related U.S. Application Data

(63) Continuation of application No. 14/286,713, filed on May 23, 2014, now Pat. No. 9,639,546.

(51) Int. Cl.
*G06F 16/18* (2019.01)
*G06F 16/28* (2019.01)
(Continued)

(52) U.S. Cl.
CPC ........ *G06F 16/289* (2019.01); *G06F 12/0868* (2013.01); *G06F 12/121* (2013.01);
(Continued)

(58) Field of Classification Search
CPC .. G06F 16/289; G06F 16/172; G06F 12/0808; G06F 12/0868; G06F 12/121; G06F 12/128; G06F 17/30041; G06F 17/30044; G06F 17/30058; G06F 17/30867; G06F 17/30994; G06F 17/30; G06F 16/2452; G06F 16/2453; G06F 16/2455;
(Continued)

(56) References Cited

U.S. PATENT DOCUMENTS 6,925,533 B2  8/2005  Lewis
8,209,363 B2  6/2012  Palthepu et al.
(Continued)

OTHER PUBLICATIONS https://code.google.com/p/s3fs/wiki/FuseOverAmazon, "s3fs FUSEbased file system backed by Amazon S3", Downloaded Apr. 16, 2015, pp. 1-8.

*Primary Examiner* — Alford W Kindred
*Assistant Examiner* — Cecile H Vo
(74) *Attorney, Agent, or Firm* — Robert C. Kowert; Kowert, Hood, Munyon, Rankin & Goetzel, P.C.

(57) ABSTRACT

An object-backed block-based storage system may store data blocks in a block cache in a non-relational database and data block objects in an object data store. Access requests for a particular data block may be received at a storage protocol target that are formatted according to a network-based storage protocol. Translated access requests formatted according to respective programmatic interfaces may be generated and sent to the non-relational database or to the object data store in order to access the particular data block. A response indicating success or failure of the access request may be sent.

20 Claims, 12 Drawing Sheets

(51) Int. Cl.
  *G06F 16/172* (2019.01)
  *G06F 12/121* (2016.01)
  *G06F 12/0868* (2016.01)
  *G06F 12/128* (2016.01)
  *G06F 12/12* (2016.01)
  *G06F 12/0808* (2016.01)

(52) U.S. Cl.
  CPC .......... *G06F 12/128* (2013.01); *G06F 16/172* (2019.01); *G06F 12/0808* (2013.01); *G06F 2212/1056* (2013.01); *G06F 2212/163* (2013.01); *G06F 2212/314* (2013.01); *G06F 2212/465* (2013.01)

(58) Field of Classification Search
  CPC ............. G06F 16/24; G06F 2212/1056; G06F 2212/163; G06F 2212/314; G06F 2212/465
  USPC .................................................. 707/707, 812
  See application file for complete search history.

(56) References Cited

U.S. PATENT DOCUMENTS

| | | |
|---|---|---|
| 8,219,639 B2 | 7/2012 | Soltis |
| 8,626,793 B2 | 1/2014 | Cameron et al. |
| 8,645,460 B2 | 2/2014 | Feng et al. |
| 9,152,600 B2* | 10/2015 | Lango .................. G06F 15/167 |
| 9,176,980 B2* | 11/2015 | Ananthanarayanan ..................... G06F 16/1858 |
| 9,384,202 B1* | 7/2016 | Tang ...................... G06F 16/134 |
| 9,471,654 B1* | 10/2016 | Bradley ................ G06F 16/212 |
| 9,639,546 B1 | 5/2017 | Gorski |
| 2008/0270461 A1* | 10/2008 | Gordon .................. G06F 3/0667 |
| 2011/0258179 A1* | 10/2011 | Weissman ......... G06F 16/24544 707/714 |
| 2012/0284317 A1 | 11/2012 | Dalton |
| 2013/0173664 A1* | 7/2013 | Xue ........................ G06F 16/25 707/792 |

* cited by examiner

OBJECT-BACKED BLOCK-BASED DISTRIBUTED STORAGE

This application is a continuation of U.S. patent application Ser. No. 14/286,713, filed May 23, 2014, now U.S. Pat. No. 9,639,546, which is hereby incorporated by reference herein in its entirety.

BACKGROUND

Large amounts of data maintained for performing various different computing tasks have increased the need to develop storage solutions capable of storing such data in an accessible way. Coupled with the varying types of computing systems used to process these large amounts of data, large scale, highly available data storage is in greater demand than ever. Many different types of large scale storage systems exist for large amounts of data, such as various types of database systems, file systems, key value data stores, and data warehouse systems. However, utilizing these storage systems may require complex or customized applications which may not provide the same performance or ease of implementation as local storage solutions. Simple block-based storage, for example, is widely supported among different systems and may be easy to integrate with a variety of different applications. Yet, such local storage options have challenges as well. Physical storage limitations, for instance, may limit the amount of storage that may be available in a local block-based storage system. Moreover, if storage needs change over time, costly investments may be required to provide enough storage capacity increasing storage needs.

Figure 1:
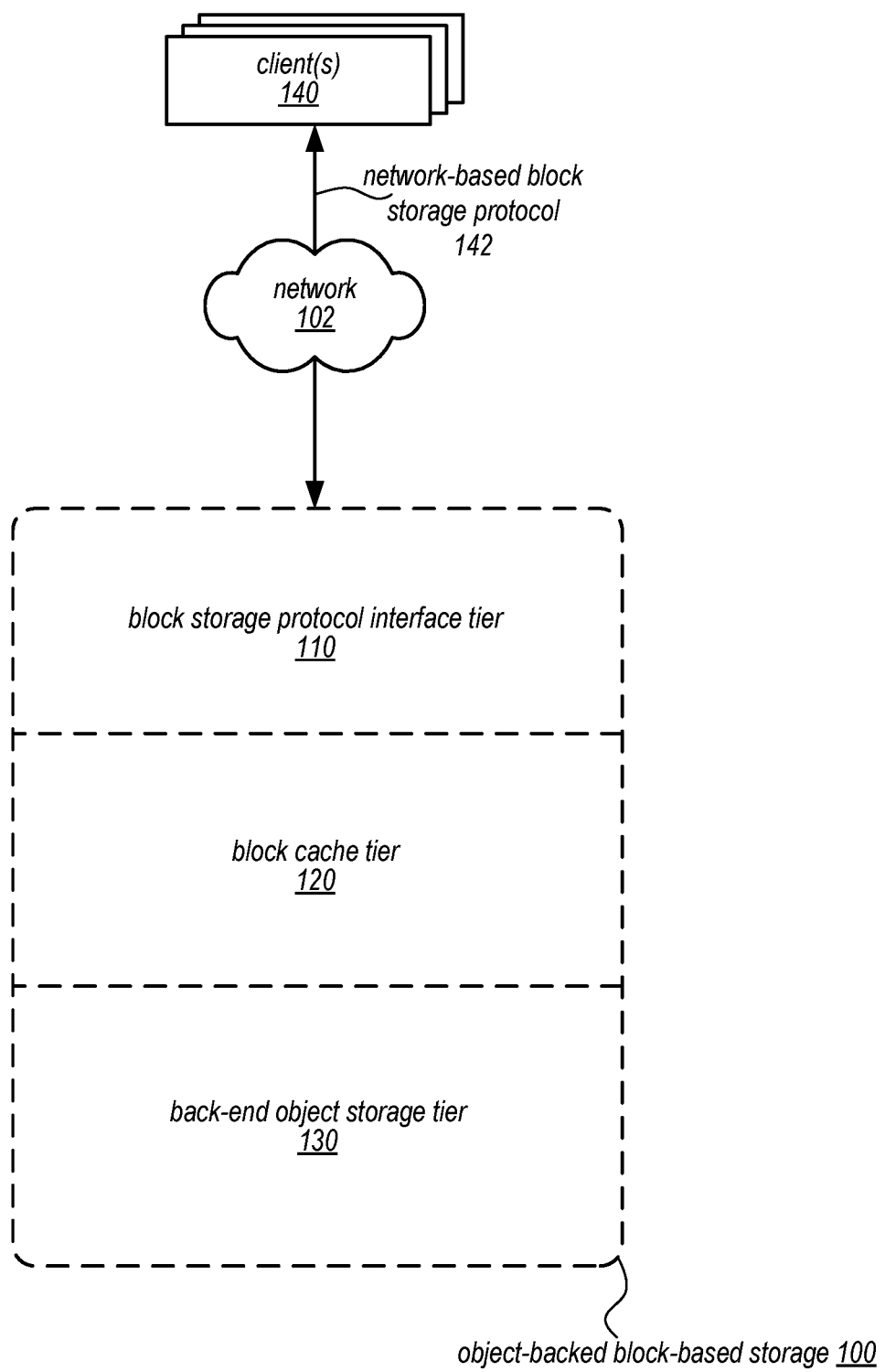
FIG. 1 is a block diagram illustrating object-backed block-based distributed storage, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). The words "include," "including," and "includes" indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated.

Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a computer system may be configured to perform operations even when the operations are not currently being performed). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION

Various embodiments of object-backed block-based storage may be implemented. Block-based data storage is a familiar and accessible storage solution for many different types of applications, operating systems, and other computing devices. Support for communicating with block-based storage is nearly universal among computing devices. However, the limitations of block-based storage may prohibit easily obtaining large amounts of block-based storage capacity. Thus other storage solutions that are implemented on top of block-based storage have been used to develop other storage systems that are more flexible to the demands of large scale data storage requirements. Object data stores, for instance, provide logical stores of data objects that are controlled via individual data objects (which may be of varying sizes) rather than individual data blocks (which may be of fixed size). Object-backed storage may be utilized to provide flexible, scalable, and durable storage for large amounts of data.

However, object data storage may limit the ability of storage clients to directly manage data, and may instead impose more complicated or complex limitations that are not imposed by block-based storage systems. For instance, block-based storage systems may be Portable Operating Small Computer Interface (POSIX) compliant, which allows for greater compatibility with many different operating systems and other components that rely upon data storage—whereas object-backed storage solutions may not be POSIX compliant. In another example, block-based storage systems may also allow control of data at the lowest level of access, whereas many object-backed storage solutions are limited to providing access to storage at the file system level (a higher, and thus less direct, level of control/access).

In various embodiments, object-backed block-based storage may be implemented for storage clients so that the flexibility, scalability, and durability of object data stores may be presented to storage clients as a block-based storage system. FIG. 1 is a block diagram illustrating object-backed block-based distributed storage, according to some embodiments. Client(s) 140 may be one or more computing systems or devices (e.g., computer system 2000 in FIG. 12) that are configured to utilize block-based storage for multiple different tasks, operations, and/or applications. Client(s) 140 may be configured to access virtual block storage maintained by object-backed block-based storage service 100 via network 102 (e.g., a wide area network (WAN) such as the Internet). In order to provide access to virtual block storage in a widely supported manner, object-backed block-based storage 100 may implement a block storage protocol interface 110, which may be configured to receive access requests for block storage from client(s) 140 via network 102 that are formatted according to a network-based storage protocol (e.g., Internet Small Computer Interface (iSCSI) or IP Fibre Channel Protocol (iFCP)). In various embodiments, a network-based storage protocol may provide block-level control or access for client(s) 140 in such a way that virtual block storage may appear from the perspective of client(s) 140 as local block storage (e.g., one or more persistent storage devices, such as hard disk drives or solid state drives which provide block storage) by generating access requests translated to programmatically access data blocks stored in block cache tier 120 or back-end object storage tier 130.

Object-backed block-based storage 100 may implement a block cache tier 120 in a non-relational database in order to provide high performance storage for virtual block storage. The non-relational database implementing the block cache may be configured to consistently process access requests in such a way as to provide POSIX compliant performance of the access requests. For example, the non-relational database system may be configured to implement a strong consistency model for write requests to the non-relational data store so that read requests for particular data blocks in the block cache include the most recently acknowledged write requests prior to receipt of the read request. Block storage protocol interface 110 may thus be configured as a network-based storage protocol target for client(s) 140 that may present itself as a block storage device and translate access requests formatted according to the network-based storage protocol into access requests formatted to programmatically access cached data block entries which correspond to data blocks in virtual block storage in the non-relational database implementing block cache tier 120 (e.g., according to an application programming interface (API) for the non-relational database).

Object-backed block-based storage 100 may also implement a back-end object storage tier 130 which may be configured to maintain data block objects corresponding to data blocks in the virtual block storage. Cached data block entries may be selectively moved from block cache tier 120 to data block objects in back-end object storage tier 130 as part of various cache management techniques. Read requests from client(s) 140 may be translated at block storage protocol interface tier 110 and sent to the current location of a data block in either block cache tier 120 and/or in back-end object storage tier 130. Typically, block cache tier 120 may respond more quickly to access requests, such as read or write requests, than back-end object data store. However, back-end object data storage tier 130 may provide highly durable and less costly storage for large amounts of data than block cache tier 120 and thus only a subset of data blocks in virtual block storage may be maintained in block cache tier 120.

Please note, FIG. 1 is provided as a logical illustration of object-backed block-based storage, and is not intended to be limiting as to the physical arrangement, size, or number of components, modules, or devices, implementing an object-backed block-based storage system.

The specification first describes an example of an object-backed block-based data store implemented as a distributed storage service. The distributed storage service may store data for many different types of clients, in various embodiments. One such client may be one or more virtual compute instances, described in further detail below. However, storage clients may be any storage client configured to access virtual block storage via a network-based storage protocol. Included in the description of the example object-backed block-based storage service are various aspects of the example object-backed block-based storage service along with the various interactions between the object-backed block-based storage service, non-relational database service and the object storage service. The specification then describes a flowchart of various embodiments of methods for implementing an object-backed block-based data store. Next, the specification describes an example system that may implement the disclosed techniques. Various examples are provided throughout the specification.

The systems described herein may, in some embodiments, implement a network-based service that enables clients (e.g., customers or subscribers) to operate virtual block-based storage in a cloud computing environment. In some embodiments, the object-backed block-based storage system may be an enterprise-class data store that is highly scalable and extensible. In various embodiments, object-backed block-based storage may be allocated in large sizes without concatenating smaller virtual data volumes to provide the virtual block storage. Thus large scale virtual block storage (e.g., multiple terabytes) may be logically treated as a single data volume.

More specifically, the systems described herein may, in some embodiments, implement a service-oriented architecture in which various functional components of object-backed block-based storage are intrinsically distributed. For example, rather than lashing together multiple block-based storage systems, devices or networks, these systems may organize the basic operations of an object-backed block-based storage service into tiers that may be individually and independently scalable. For example, in some embodiments, object-backed block-based storage may include an interface tier of network-based storage protocol targets configured to service access requests for a data volume, a block caching tier implemented in a non-relational database service configured to operate as a data block cache for access requests, and a back-end object storage tier configured to store data block objects for as part of the one large data volume.

Figure 2:
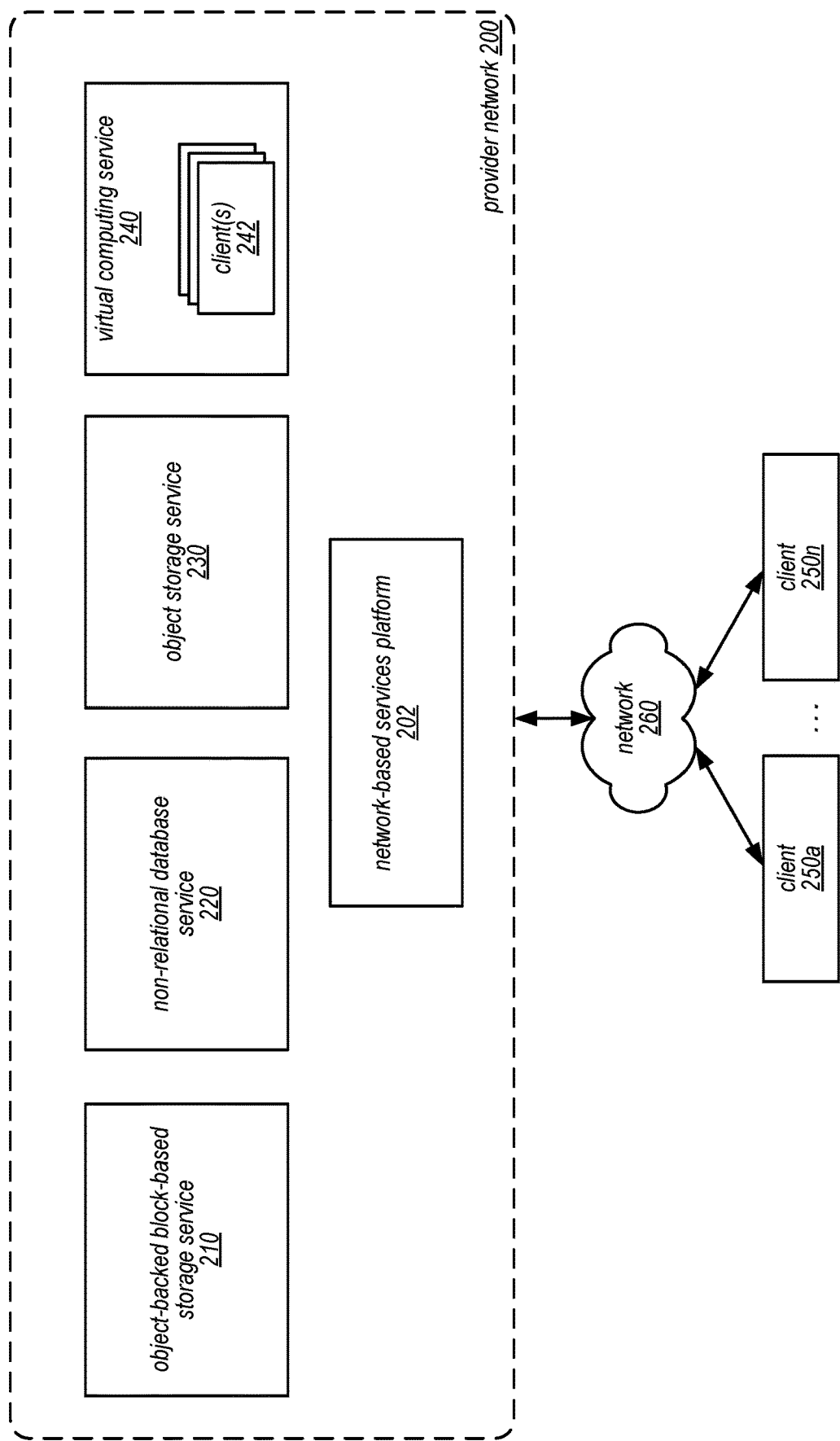
FIG. 2 is a block diagram illustrating a network-based service system architecture that may be configured to implement an object-backed block-based storage service, non-relational database service and object storage service, according to some embodiments.

FIG. 2 is a block diagram illustrating a network-based service system architecture that may be configured to implement an object-backed block-based storage service, non-relational database service and object storage service, according to some embodiments. In the illustrated embodiment, a number of clients (shown as clients 250a-250n) may be configured to interact with a network-based services platform 202 via a network 260 implemented as part of provider network 200. Provider network 200 may be set up by an entity such as a company or a public sector organization to provide one or more services (such as various types of cloud-based computing or storage) accessible via the Internet and/or other networks to clients 250. Provider network 200 may include numerous data centers hosting various resource pools, such as collections of physical and/or virtualized computer servers, storage devices, networking equipment and the like (e.g., computing system 2000 described below with regard to FIG. 12), needed to implement and distribute the infrastructure and services offered by the provider network 200. Network-based services platform 202 may be configured to interface with object-backed block-based storage service 210, a non-relational database service 220, an object storage service 230 and/or one or more other virtual computing services, such as virtual computing service 240. It is noted that where one or more instances of a given component may exist, reference to that component herein may be made in either the singular or the plural. However, usage of either form is not intended to preclude the other.

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment 2000 illustrated in FIG. 12 and described below. In various embodiments, the functionality of a given service system component (e.g., a component of the object-backed block-based storage service, non-relational database service, object storage service or virtual computing service) may be implemented by a particular node or may be distributed across several nodes. In some embodiments, a given node may implement the functionality of more than one service system component (e.g., more than one object-backed block-based storage service system component).

Generally speaking, clients 250 may encompass any type of client configurable to submit network-based services requests to network-based services platform 202 via network 260, including requests for database services (e.g., a request to generate a snapshot, etc.). In at least some embodiments, network-based service requests may include network-based storage protocol requests which may be configured to treat virtual block storage allocated in object-backed block-based storage service 210 as if it were local physical block storage directly attached to a client 250. For instance, a client 250 (e.g., an object-backed block-based storage service 210 client) may encompass an operating system or application such as a media application, an office application or any other application that may make use of block-based storage resources to store and/or access virtual block storage. However, some requests may also be made according various different kinds of other network-based protocols. For example, a given client 250 may include a suitable version of a web browser, or may include a plug-in module or other type of code module configured to execute as an extension to or within an execution environment provided by a web browser. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 250 may be an application configured to interact directly with network-based services platform 200. In some embodiments, client 250 may be configured to generate network-based services requests according to a Representational State Transfer (REST)-style network-based services architecture, a document- or message-based network-based services architecture, or another suitable network-based services architecture.

In some embodiments, a client 250 (e.g., an object-backed block-based storage service 210 client) may be configured to provide access to an object-backed block-based storage service 210 to other applications in a manner that is transparent to those applications. For example, client 250 may be configured to integrate with an operating system or file system to provide block-based storage in accordance with a conventional storage device interface (e.g., small computer interface (SCSI)). In such an embodiment, applications may not need to be modified to make use of an object-backed block-based storage service 210. Instead, the details of interfacing to network-based services platform 202 or an object-backed block-based storage service 210 client may be coordinated by client 250 and the operating system or file system on behalf of applications executing within the operating system environment according to a network-based storage protocol.

Clients 250 may convey network-based services requests (e.g., allocate virtual block storage.) to and receive responses from network-based services platform 202 (or directly to object-backed block-based storage service 210, non-relational database service 220, object storage service 230 or virtual computing service 240) via network 260. In various embodiments, network 260 may encompass any suitable combination of networking hardware and protocols necessary to establish network-based-based communications between clients 250 and platform 200. For example, network 260 may generally encompass the various telecommunications networks and service providers that collectively implement the Internet. Network 260 may also include private networks such as local area networks (LANs) or wide area networks (WANs) as well as public or private wireless networks. For example, both a given client 250 and network-based services platform 202 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and network-based services platform 202. It is noted that in some embodiments, clients 250 may communicate with network-based services platform 202 using a private network rather than the public Internet.

Generally speaking, network-based services platform 202 may be configured to implement one or more service endpoints configured to receive and process network-based services requests, such as requests to allocate virtual block storage. For example, network-based services platform 202 may include hardware and/or software configured to implement a particular endpoint, such that an HTTP-based network-based services request directed to that endpoint is properly received and processed. In one embodiment, network-based services platform 202 may be implemented as a server system configured to receive network-based services requests from clients 250 and to forward them to components of a system that implements an object-backed block-based storage service 210 for processing. In other embodiments, network-based services platform 202 may be configured as a number of distinct systems (e.g., in a cluster topology) implementing load balancing and other request management features configured to dynamically manage large-scale network-based services request processing loads. In various embodiments, network-based services platform 202 may be configured to support REST-style or document-based (e.g., SOAP-based) types of network-based services requests.

In addition to functioning as an addressable endpoint for clients' network-based services requests, in some embodiments, network-based services platform 202 may implement various client management features. For example, platform 202 may coordinate the metering and accounting of client usage of network-based services, including storage resources, such as by tracking the identities of requesting clients 250, the number and/or frequency of client requests, the size of data tables (or records thereof) stored or retrieved on behalf of clients 250, overall storage bandwidth used by clients 250, class of storage requested by clients 250, or any other measurable client usage parameter. Platform 202 may also implement financial accounting and billing systems, or may maintain a database of usage data that may be queried and processed by external systems for reporting and billing of client usage activity. In certain embodiments, platform 202 may be configured to collect, monitor and/or aggregate a variety of storage service system operational metrics, such as metrics reflecting the rates and types of requests received from clients 250, bandwidth utilized by such requests, system processing latency for such requests, system component utilization (e.g., network bandwidth and/or storage utilization within the storage service system), rates and types of errors resulting from requests, characteristics of stored and requested data pages or records thereof (e.g., size, data type, etc.), or any other suitable metrics. In some embodiments such metrics may be used by system administrators to tune and maintain system components, while in other embodiments such metrics (or relevant portions of such metrics) may be exposed to clients 250 to enable such clients to monitor their usage of object-backed block-based storage service 210 (or the underlying systems that implement those services, such as non-relational database service 220 or object storage service 230).

In some embodiments, network-based services platform 202 may also implement user authentication and access control procedures. For example, for a given network-based services request to create or modify a particular data volume, platform 202 may be configured to ascertain whether the client 250 associated with the request is authorized to create or modify the particular data volume. Platform 202 may determine such authorization by, for example, evaluating an identity, password or other credential against credentials associated with the particular database, or evaluating the requested access to the particular database against an access control list for the particular database. For example, if a client 250 does not have sufficient credentials to create or modify the particular data volume, platform 202 may reject the corresponding network-based services request, for example by returning a response to the requesting client 250 indicating an error condition. Various access control policies may be stored as records or lists of access control information by object-backed block-based storage service 210.

It is noted that while network-based services platform 202 may represent an interface through which clients 250 may access some features of object-backed block-based storage service 210, it need not represent the sole interface to such features. For instance as discussed above with regard to FIG. 1, once provisioned network-based storage access requests (e.g., write requests or read requests for data blocks in virtual block storage) may be sent directly to a storage protocol target provisioned in object-backed block-based storage service 210 for the data volume, as described in greater detail below with regard to FIGS. 5 and 6. Object-backed block-based storage service 210 may then generate translated access requests as needed in order to access data blocks located in a block cache table maintained in the non-relational database service 220 for the data volume and/or data block objects for the data volume maintained in object storage service 230. For instance, object-backed block-based storage service 210 may operate as an internal "client" of non-relational database service 220 and/or object storage service 230.

In at least some embodiments, virtual computing service 240 may implement virtual compute instances that are clients 242 of object-backed block-based storage service 210, as opposed to clients external 250 from provider network 200, configured to access virtual block storage maintained for the compute instances at object-backed block-based storage service 210. For example, virtual compute service 240 may offer various compute instances to clients 250. A virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). A number of different types of computing devices may be used singly or in combination to implement the compute instances of virtual compute service 240 in different embodiments, including general purpose or special purpose computer servers, storage devices, network devices and the like. In some embodiments instance clients 250 or other any other user may be configured (and/or authorized) to direct network traffic to a compute instance 242. In some embodiments, virtual compute instances may implement or perform various applications, tasks, or operations that may access virtual block storage, which may be provided as part of object-backed block-based storage service 210. In various embodiments, compute instances may attach or map to one or more data volumes provided object-backed block-based storage service 210 in order to obtain persistent block-based storage for performing various operations.

Figure 3:
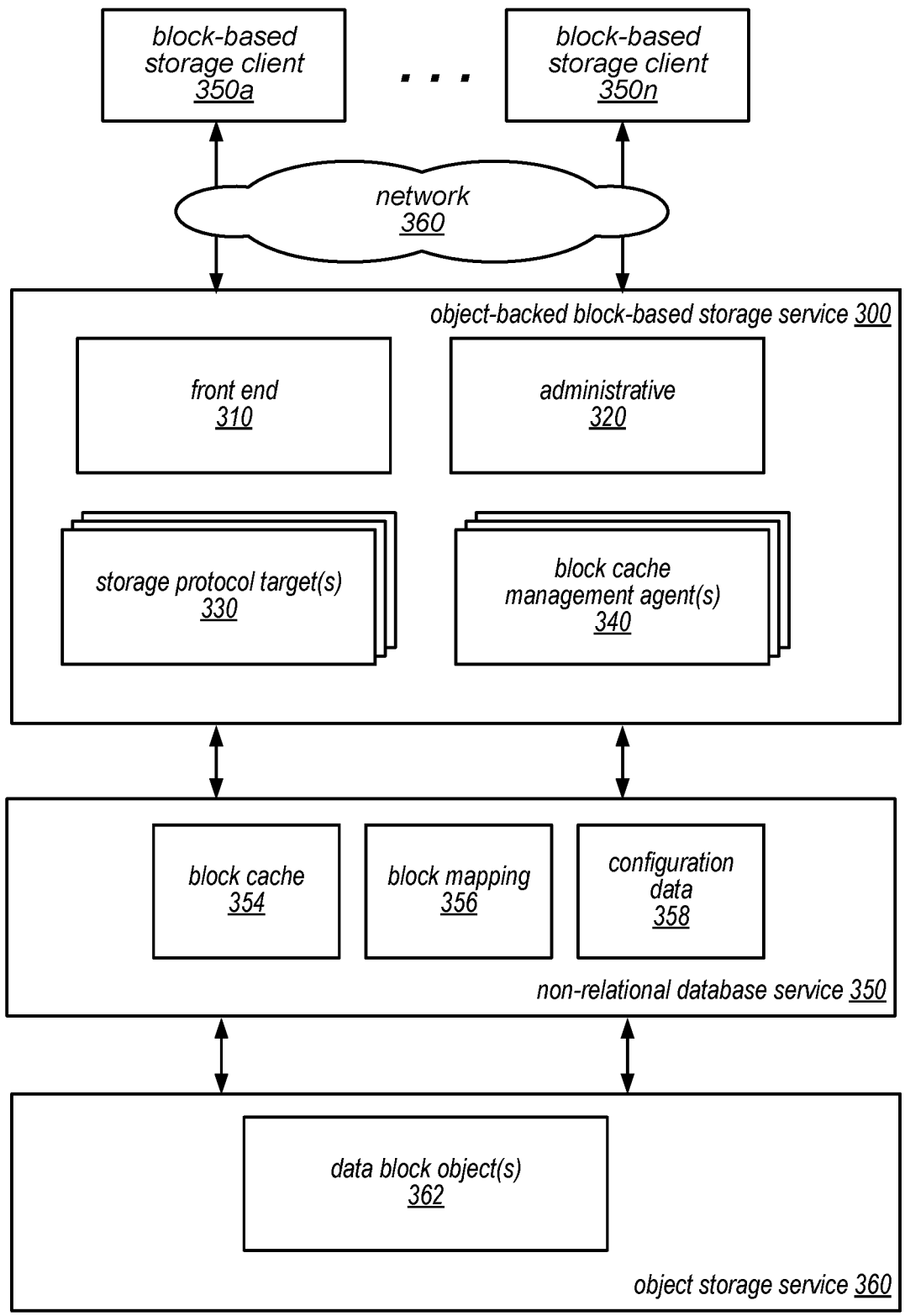
FIG. 3 is a block diagram illustrating various components of an object-backed block-based storage service that includes a separate non-relational database service and a separate object data storage service, according to some embodiments.

FIG. 3 is a block diagram illustrating various components of an object-backed block-based storage service that includes a separate non-relational database service and a separate object data storage service, according to some embodiments. As noted above, storage clients of object-backed block-based storage 350 may be any computing system or device configured to communicate with object-backed block-based storage service 300 via a network 360. Object-backed block-based storages service 300 may be configured to generate translated access requests for the network-based storage protocol into programmatic interfaces for non-relational database service 350 and object storage service 360.

Object-backed block-based storage service 300 may implement various components in order to provide object-backed block-based storage. As illustrated in FIG. 3, object-backed block-based storage service 300 may implement a front end component 310. Front end 310 may be configured to process service level requests for object-backed block-based storage service 300 (as opposed to requests for a particular data volume formatted according to the network-based storage protocol). For example, requests to allocate virtual block storage, reconfigure or adjust cache management schemes, delete a data volume, or other service configuration requests or tasks may be parsed and directed to the appropriate components in object-backed block-based storage service 300, as described below with regard to FIGS. 4 and 8. If, for instance a new data volume is created, the data volume may be registered with administrative component 320, as well as block cache management agents 340. Thus front end 310 may be configured to process requests for object-backed block-based storage service 300 according to a programmatic interface (API) for object-backed block-based storage service 300. However, other components implemented as part of object-backed block-based storage service 300 may also be configured to communicate via the API for object-backed block-based storage service 300.

In some embodiments, object-backed block-based storage service 300 may implement administrative component 320. Administrative component 320 may perform various administrative or service related tasks and operations for object-backed block-based storage service 300. For instance, administrative component 320 may monitor traffic directed toward particular storage protocol target(s) 330 and determine whether additional storage protocol target nodes may need to be provisioned in support. Administrative component 320 may also be configured to manage failures among storage protocol target(s) 330 and block cache management agent(s) 340.

In various embodiments, object-backed block-based storage service 300 may implement storage protocol target(s) 330 in order to process access requests for particular data volumes, such as described below with regard to FIGS. 5, 7, 9 and 10. Storage protocol target(s) 330 may be implemented as a pool of storage protocol target nodes that may implement different targets singly or together for the same data volume. In at least some embodiments, multiple storage protocol target nodes may be implemented strategically across multiple data centers or fault tolerance zones in order to maintain availability for processing access requests as a storage protocol target 330. Storage protocol target(s) 330 may operate in a stateless manner, without needing to preserve information about particular data volumes for which access requests are processed. For instance, block mapping information, such as the current location of a particular data block in non-relational database service 350 or object storage service 260 may not need to be retained in the event of a failure of a particular storage protocol node. The failed storage protocol node may simply restart, obtain new configuration information and/or instructions from administrative module 320 or front end 310, and being processing access requests for the same or a different data volume. In this way, robustness characteristic of distributed systems may be implemented for storage protocol target(s) 330 processing access requests.

In various embodiments, object-backed block-based storage service 300 may implement block cache management agent(s) 340. A pool of compute nodes configured to implement one or more respective block cache management agent(s) 340 may be implemented. As discussed above with regard to storage protocol target(s) 330, block cache management agent(s) 340 may be configured to operate in stateless manner, selecting cached data block entries in a block cache 354 for a data volume to be moved to data block objects 362 in object storage service 360, as discussed below with regard to FIGS. 6 and 11.

Non-relational database service 350 may, in various embodiments, be a database system that provides creation, management, and/or storage of data according to a non-relational format. For example, non-relational database service 350 may store block cache 354, block mapping information 356, and data volume configuration data 358 in one or more tables in tables containing items representative of data blocks that have one or more attributes. These items may be referred to as cached block entries. In some embodiments, non-relational database service 350 may present clients/users (e.g., object-backed block-based storage service 300) with a data model in which each table maintained on behalf of a client/user contains one or more items, and each item includes a collection of attributes. The attributes of an item may be a collection of name-value pairs, in any order. In some embodiments, each attribute in an item may have a name, a type, and a value. Some attributes may be single valued, such that the attribute name is mapped to a single value, while others may be multi-value, such that the attribute name is mapped to two or more values. In some embodiments, the name of an attribute may always be a string, but its value may be a string, number, string set, or number set. The following are all examples of attributes: "DataBlockID"=1, "Block-Data"="101000101010101001010", "Location"="Object Store". The items may be managed by assigning each item a primary key value (which may include one or more attribute values), and this primary key value may also be used to uniquely identify the item. In some embodiments, a large number of attributes may be defined across the items in a table, but each item may contain a sparse set of these attributes (with the particular attributes specified for one item being unrelated to the attributes of another item in the same table), and all of the attributes may be optional except for the primary key attribute(s). In other words, unlike in relational databases, the tables maintained by the data storage service (and the underlying storage system) may have no pre-defined schema other than their reliance on the primary key. Note that in some embodiments, if an attribute is included in an item, its value cannot be null or empty (e.g., attribute names and values cannot be empty strings), and, and within a single item, the names of its attributes may be unique. Non-relational database service 350 may be configured as a multi-tenant database service. For instance, a block cache table for one client may physically be stored or processed at a same location or node as data for another table for another client (which may not be a block cache table).

Non-relational database service 350 may be configured to process access requests for a particular cached block entry in block cache 354 in such a way as to be POSIX compliant, in at least some embodiments. In other words, a consistency model may be enforced such that acknowledgements of a sent write may be received for the write before another access request (e.g., read or write request) for the data block may be allowed. Non-relational database service 350 may be configured to provide high-performance for write and read request as part of implementing block cache 354. Thus, requests to non-relational database service 350 are typically completed significantly faster than requests to object storage service 360.

Block cache 354 may include multiple cached block entries corresponding to data blocks in the data volume of virtual block storage. Each data block may correspond to a particular cached block entry. Note, however, that in various embodiments a majority of data blocks may be stored in data block objects 362 in object storage service 360 and not in cached data block entries in non-relational database service 350. Thus, block cache 354 may be limited in the number of cached data block entries that may be stored at any given time. As noted above, block cache management agent(s) 340 may enforce block cache management schemes to select which cached data block entries stay in block cache 354 and which are moved to data block object(s) 362. Block mapping information 356 and configuration data 358 may be stored in separate or the same table as block cache 354 and may provide information as to the location of data blocks and other descriptive information about the data volume (e.g., size, format, type of cache management scheme, authorized users, etc. . . . ).

Object storage service 360 may, in various embodiments, provide storage for data block object(s) 362 for a data volume of virtual block storage provided by object-backed block-based storage service 300. Object storage service 360 may be highly durable data store that provides object storage (e.g., key value storage) for storage clients (object-backed block-based storage service 300). Storage associated with a particular data volume may include as many data block objects as specified in the data volume of virtual block storage, in some embodiments. In at least some embodiments, object storage service may provide storage at a significantly lower cost than that of non-relational database service 350. However, performance latency for access operations may be much higher (e.g., slower) than that of access operations for non-relational database service 350. Object storage service 360 may implement multi-tenant storage, in some embodiments. Thus, data block objects for one data volume for one storage client may be physically stored or processed at a same location or node as data for another client (which may or may not be object-backed block-based storage service 300).

Figure 4:
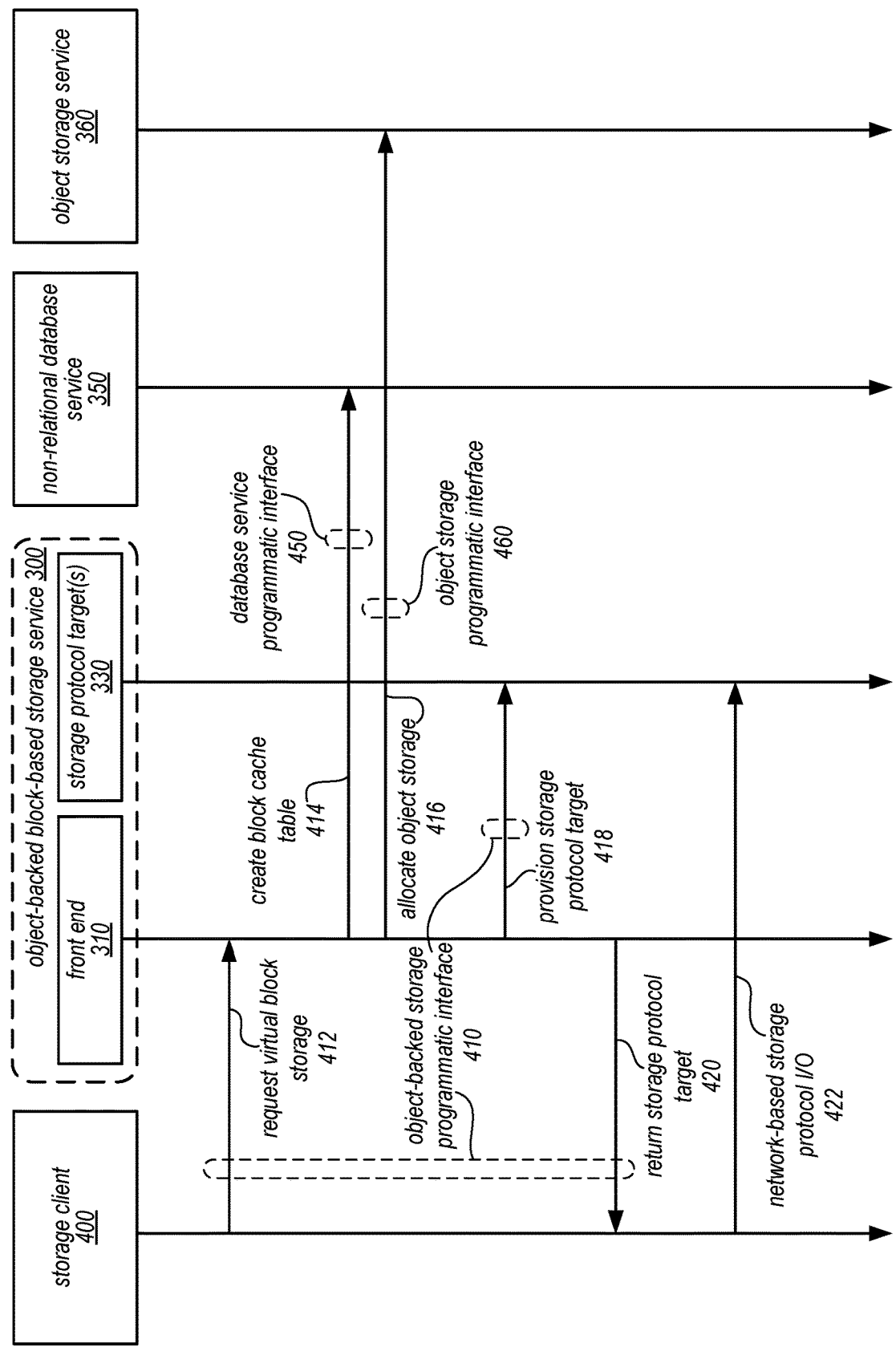
FIG. 4 is a diagram illustrating interactions between a client, object-backed block-based storage service, and other services for allocating virtual block storage, according to some embodiments.

FIG. 4 is a diagram illustrating interactions between a client, object-backed block-based storage service, and other services for allocating virtual block storage, according to some embodiments. Storage client 400 may be any client (e.g., storage client 350) that is configured to connect to and send requests for virtual block storage according to an object-backed storage programmatic interface 410 and a network-based storage protocol. Requests for virtual block storage 412 may be received at front end 310. Virtual block storage requests may include the overall size of the data volume or number of data blocks to be included. Further specification may include the size of individual data blocks (e.g., 512 or 1024 bytes). Other configuration information, such as cache management schemes or other information describing the management, performance, or operation (e.g., the network-based storage protocol to be used) of the requested virtual block storage may also be included in the request 412.

Front end 310 may be configured to invoke, assign, provision, create, or otherwise configure resources to provide object-backed block-based storage. For example, front end 310 may send a create table request to store a block cache 414 to non-relational database service 350. The request may include a table name, attribute names and/or types, or whether any secondary indexes or other indexing schemes may be employed, in various embodiments. As illustrated in FIG. 4, the creation request 414 may be sent via a database service programmatic interface 450, such as an API. Although not illustrated, an acknowledgement or other response may be received from the non-relational database service 350 at front end 310.

Front end 310 may also send one or more allocation/creation requests for object storage 416 to object storage service 360, which may be formatted according to a programmatic interface for the object storage service 460. A general storage area configuration or allocation may be made for storing data block objects, which may then be later populated with data block objects as they are created/stored, or corresponding data block objects for each data block in the data volume may be created, in various embodiments. Data block objects may be formatted, sized, or otherwise configured as specified in the request for virtual block storage 412. For instance, if the data block size is specified as 512 bytes, then the data block object size may be correspondingly set at 512 bytes. Although not illustrated, an acknowledgement or other response may be received from the object storage service 360 at front end 310 for the allocation request(s).

In some embodiments, front end 310 may provision 417 storage protocol target(s) 330 to process access requests for the virtual block storage. For instance, front end 310 may determine which storage protocol target resources (e.g., nodes) are available to service as a storage protocol target.

One or more of these storage protocol target resources may be assigned and configured to operate as the storage protocol target for virtual block storage. For example, a registration or configuration command may be sent to particular nodes that identifies the virtual block storage for which a storage protocol target is to be implemented, the location of configuration information, block mapping information, and/or other information necessary to communicate with the block cache table in non-relational database service 350 and data block objects in object storage service 360. The command may trigger initialization or restart processes that prepare the storage protocol target node(s) to implement storage protocol target(s) 330. In at least some embodiments, multiple storage protocol target nodes may implement the storage protocol target(s) 330 for the same data volume of virtual block storage. For instance, if the same network-based storage protocol is to be used, load balancing techniques may distribute network-based storage protocol I/O 422 among the multiple storage protocol target nodes (though storage client 400 may not be aware of such distribution).

The provisioned storage protocol target may be returned 420 or identified to storage client to storage client 400, in various embodiments. The identifier for the storage protocol technique may be formatted according to a network-based storage protocol. For instance, if iSCSI storage protocol is to be implemented for access requests, then the identifier for the storage protocol targets may be an iSCSI Qualified Name (IQN). In some embodiments, Internet Storage Name Service (iSNS) protocols or other similar discovery techniques may be implemented to provide storage client 400 with the storage protocol target(s) 300 for requested virtual block storage. Access requests and other I/O 422 may then be directed toward the provisioned storage protocol target(s) 330 according to the network-based storage protocol. In some embodiments, storage client 400 may implement multi-pathing or other self-balanced requests 422 to be sent to storage protocol target(s).

Figure 5:
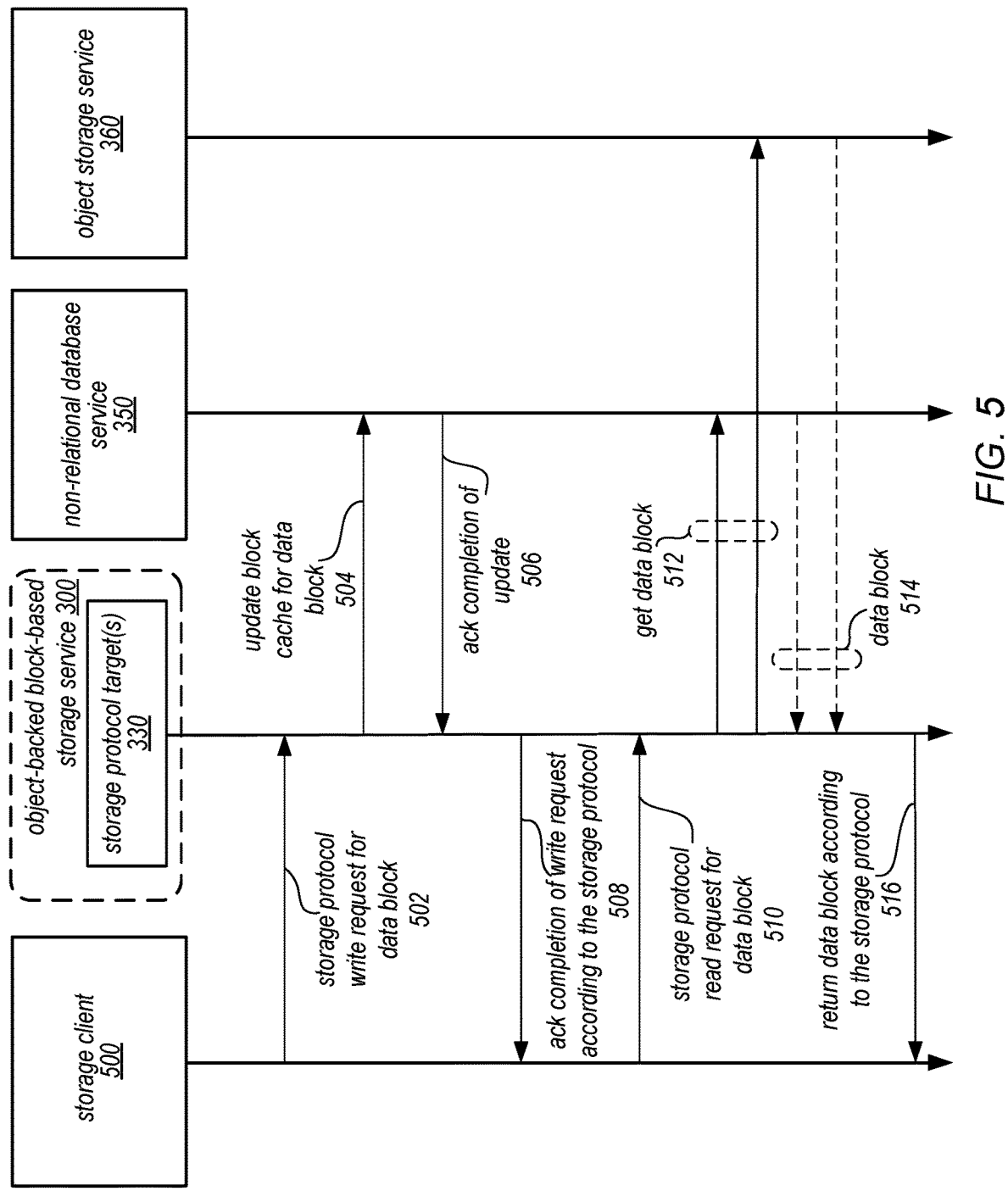
FIG. 5 is a diagram illustrating interactions between a client, object-backed block-based storage service, and other services for performing read and write requests to virtual block storage, according to some embodiments.

FIG. 5 is a diagram illustrating interactions between a client, object-backed block-based storage service, and other services for performing read and write requests to virtual block storage, according to some embodiments. Storage client 500 may be any client (e.g., storage client 350) that is configured to connect to and send access requests for virtual block storage according to a network-based storage protocol. As noted above, storage protocol target(s) 330 in object-backed block-based storage service 300 may be configured to generate translated access requests for virtual block storage. Storage protocol target(s) 330 may be configured to programmatically access the block cache table in the non-relational database service 350 and to programmatically access object storage service 360 in order to modify, create, delete, or otherwise perform actions corresponding to access requests received at the storage protocol target(s) for the virtual block storage. Please note that the various interactions discussed below may be formatted according to programmatic interfaces (APIs) for the non-relational database service 350 and the object storage service 360, such as database service programmatic interface 450 or object storage programmatic interface 460.

For example, storage client 500 may send a write request 502 formatted according to a network-based storage protocol to storage protocol target 330 in order to write to a particular data block of virtual block storage. Storage protocol target 330 may be configured to generate a request 504 to update (or create) a cached data block entry for the particular data block in non-relational database service 350. An acknowledgement of completion for the update 506 may be received back at storage protocol target 330, and in turn a corresponding acknowledgment 508 of completion may be sent to storage client for the write request formatted according to the network-based storage protocol. Although not illustrated, block mapping information or metadata may be updated to reflect the current location of the current data block in the non-relational database. In some embodiments, an update or creation request (not illustrated) may also be sent to object storage service 360 to create a corresponding data block object for potentially cheaper or more durable storage of the write request. However, completion at the non-relational database 350 for the same write may occur much faster than at object storage service 360, so an acknowledgment back from object storage service of the write may be used to trigger an operation to mark for deletion or delete the cached data block entry from non-relational database service 350 instead of sending an acknowledgement to storage client 500 (although if for some reason the write request to object storage service completed faster an acknowledgment 508 may be sent). In this way the speed of the non-relational database service 350 may be leveraged to quickly process the write request, while the greater cost efficiency of the object storage service 360 may be leveraged to provide long-term storage for the write request.

In another example, a read request 510 for a particular data block may be formatted according to a network-based storage protocol and sent from storage client 500 to storage protocol target 330. In some embodiments, storage protocol target 330 may first determine a current location for the particular data block and send a get request for the data block to the identified location (e.g., in the non-relational database service 350 or the object storage service 360). As described below with regard to FIG. 6, cached data block entries may be moved to data block objects in object storage service 360, thus a current location for the particular data block may be in object storage service 360 for servicing read requests. As illustrated in FIG. 5, in some embodiments, storage protocol target 330 may send a request to get the data block 512 to both the non-relational database service 350 and object storage service 360. Both, either, or none may return the data block 514 (as indicated by the dashed lines). For example, the requests 512 for the data block may be made without any certainty that the particular data block is currently located in the block cache at non-relational database 350 or object storage service 360. Only the service that has the data block may respond (or services that do not have the data block may respond with an error). The data block that is received 514 may then be returned to storage client 500 according to the storage protocol 516. In some embodiments, conflicting versions of the data block may be resolved by querying an authoritative source, such as block mapping information or metadata (which may be maintained in non-relational database service 350). However, in other embodiments, the version of the data block returned from the block cache may always be considered authoritative.

Figure 6:
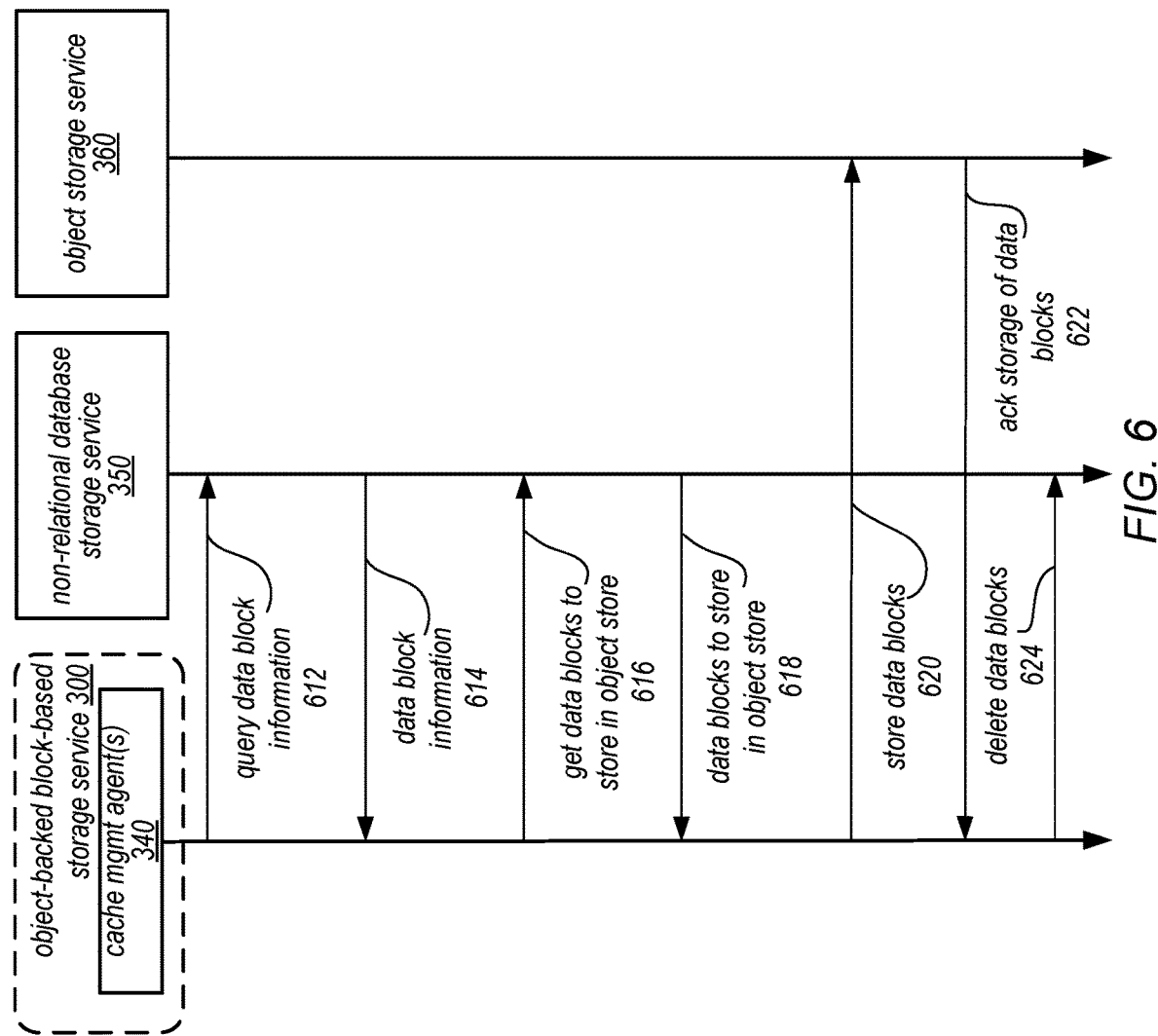
FIG. 6 is a diagram illustrating interactions between an object-backed block-based storage service, and other services for performing cache management operations for virtual block storage, according to some embodiments.

FIG. 6 is a diagram illustrating interactions between an object-backed block-based storage service, and other services for performing cache management operations for virtual block storage, according to some embodiments. As noted above, cache management agents 340 in object-backed block-based storage service 300 may be configured to manage the block cache for the virtual block storage in the non-relational database service 350. Cache management agent(s) 340 may be configured to programmatically access the block cache table in the non-relational database service 350 and to programmatically access object storage service

360 to modify, create, delete, or otherwise management data block objects for the virtual block storage. Please note that the various interactions discussed below may be formatted according to programmatic interfaces (APIs) for the non-relational database service 350 and the object storage service 360, such as database service programmatic interface 450 or object storage programmatic interface 460.

In various embodiments, cache management agent(s) 340 may query data block information 612 from non-relational database service 350. This data block information may be block mapping information, or other block metadata or descriptive information which may indicate the location of particular data blocks, whether in cached data block entries or in data block objects. In some embodiments, cached block entries may be stored in non-relational database service 350 as items (as discussed above with regard to FIG. 3). These items may have different attributes, one of which may indicate whether or not a cached data block entry has been moved to be stored in a data block object in object storage service 360. Non-relational database service 350 may be configured to provide a secondary index based on these attributes, and thus query 612 for data block information may be directed toward this secondary index in order to identify those items (cached data block entries) that have not been stored in the object storage service 360.

The requested data block information may be received 614, and cache management agent(s) 340 may analyze the data to determine which data blocks to move to object storage service 360. For example, FIG. 11 discussed below, describes several different cache management schemes which may be implemented to select cached block entries for removal. Priority schemes, replacement techniques, or size restrictions may be implemented for cached data block entries in non-relational database service 350 and used for select cached data block entries to be moved. Once selected, the data in the cached data block entries may be retrieved 616 from non-relational database service 350. The data may be received 618 from the non-relational database service 350, and formatted into requests to store the data into data block objects in object store 620. Although not illustrated, in some embodiments cached data block entries may be directly sent from non-relational database service 350 to data blocks in object storage service 360. Once acknowledgements of the data block storage are received 622, then delete requests 624 may be sent to remove the selected cached block entries from the non-relational database service. In some embodiments, other updates may be made to mapping information or other metadata to indicate the current location of the data blocks.

Note that in various embodiments, the programmatic interfaces (API) calls and responses among storage client 400, storage client 500, object-backed block-based storage service 300, non-relational database service 350 and object storage service 360 in FIGS. 4-6 may be performed over a secure proxy connection (e.g., one managed by a gateway control plane), or may be performed over the public network or, alternatively, over a private channel such as a virtual private network (VPN) connection. These and other APIs to and/or between components of the systems described herein may be implemented according to different technologies, including, but not limited to, Simple Object Access Protocol (SOAP) technology and Representational state transfer (REST) technology. For example, these APIs may be, but are not necessarily, implemented as SOAP APIs or RESTful APIs. SOAP is a protocol for exchanging information in the context of network-based services. REST is an architectural style for distributed hypermedia systems. A RESTful API (which may also be referred to as a RESTful network-based service) is a network-based service API implemented using HTTP and REST technology. The APIs described herein may in some embodiments be wrapped with client libraries in various languages, including, but not limited to, C, C++, Java, C# and Perl to support integration with object-backed block-based storage service 300, non-relational database service 350 and object storage service 360.

Figure 7:
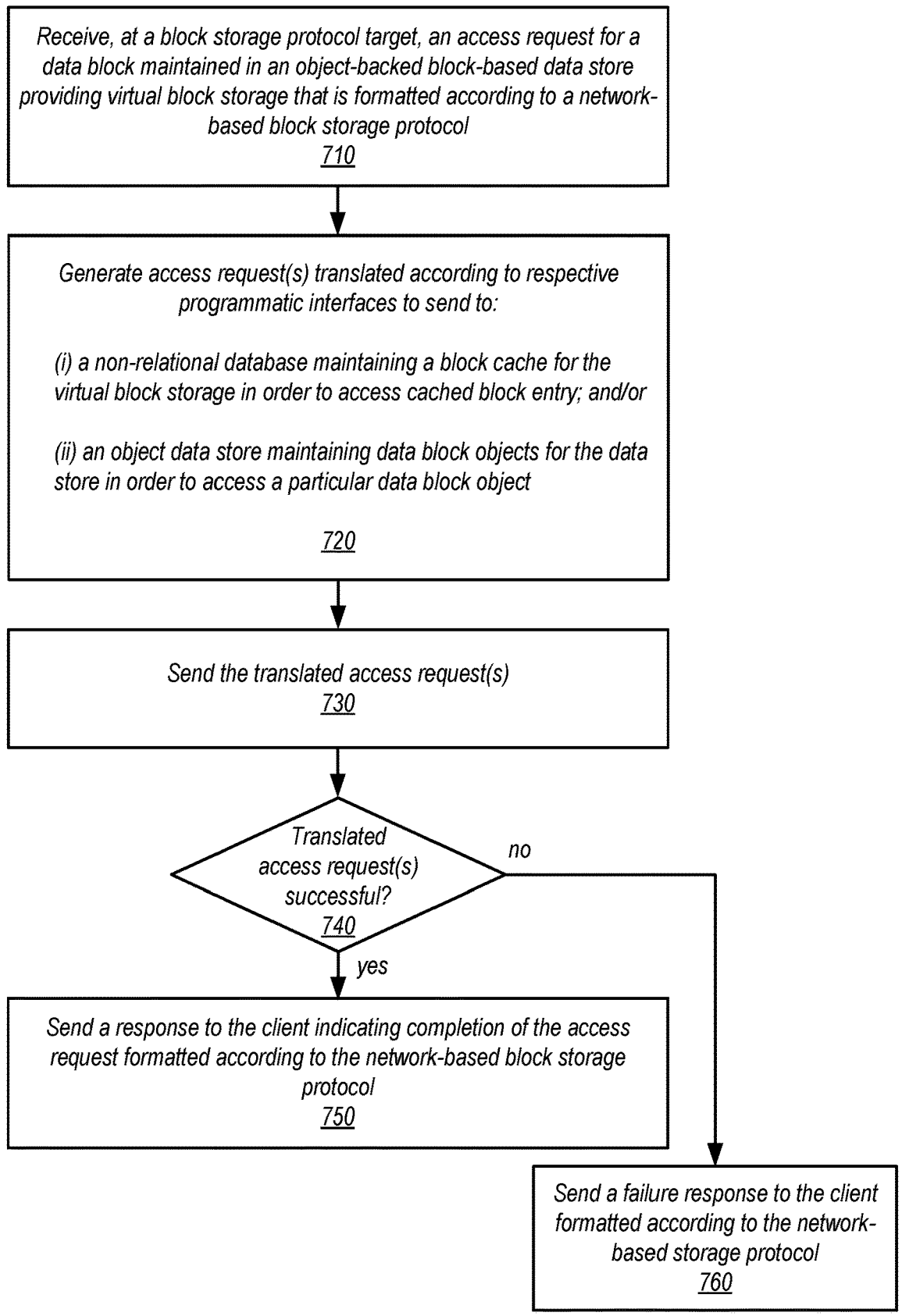
FIG. 7 is a high-level flowchart illustrating methods and techniques for implementing object-backed block-based distributed storage, according to some embodiments

The various embodiments of object-backed block-based storage described with regard to FIGS. 2-6 above, may implement one or more different techniques for implementing the object-backed block-based storage. Object-backed block-based storage is not limited to such systems, however. Various other kinds of systems may implement object-backed block-based storage. For example, instead of a service architecture, a system may include various different components to perform the different capabilities of the non-relational database and the object data store internal to the object-backed block-based store. FIG. 7 is a high-level flowchart illustrating methods and techniques for implementing object-backed block-based distributed storage, according to some embodiments. Different combinations of systems and/or devices may implement the various techniques discussed below.

In various embodiments, storage protocol targets may be implemented for an object-backed block-based object data store. These storage protocol targets may allow for various different systems, components, or devices acting as clients to connect. Clients may not have to conform to specific protocol for the object-backed block-based storage, such as a particular programmatic interface (API) to connect, but may instead utilize a standard network-based block storage protocol, such as Internet Small Computer System Interface (iSCSI), Internet Fibre Channel Protocol (iFCP), Fibre Channel over Ethernet (FCoE), Fibre Channel over IP (FCIP), or IP over Fibre Channel (IPFC). Once a connection is established, in various embodiments access requests may be received at a storage protocol target for particular data blocks of the virtual block storage in the object-backed block-based data store, as indicated at 710. The access requests may be formatted according to a network-based storage protocol, as noted above. The request may thus indicate (as proscribed by the network-based storage protocol format) the particular operation (e.g., write or read) to perform, as well as the identity of the data block in the virtual block storage. For instance, an iSCSI request may be formatted to include a correct command descriptor block (CDB).

In at least some embodiments, a determination may be made as to whether the access request is authorized to access the particular data block. For example, a challenge and response/handshake protocol may be implemented to first authenticate a storage client sending access requests to the storage protocol target. Challenge-Handshake Authentication Protocol (CHAP) is one example of an authentication procedure that may be implemented in conjunction with the network-based storage protocol for access requests. The requests or any data contained therein may also be encrypted or compressed in various ways which the storage protocol target may be configured to evaluate or unencrypt or decompress before performing additional processing. In some embodiments a set of clients operating in a particular secure network or security group may be exclusively authorized to perform access requests, and thus access request authorization may be evaluated in light of the client's membership (or lack thereof) in the authorized set or security group.

As indicated at 720, translated access requests may be generated and sent to a non-relational database maintaining a block cache for the virtual block storage in order to access a cached block entry and/or an object data store maintaining data block objects for the data store in order to access a particular data block, in various embodiments. Access requests may be translated according to a respective programmatic interface of the system to which they are bound. For instance, if a write request is received at the storage protocol target node in an iSCSI format, a write request that is formatted according to an API for the non-relational database may then be generated. Similarly, a read request formatted according to iFCP may be translated into a request to obtain data from a data block object in the object data store.

In some embodiments, the location or identity of a data block may be determined in order to generate translated access requests. For instance, mapping information, block metadata or other configuration information may be accessed and used to populate the translated access requests. Information, such as data block object identifiers or cached block entry identifiers may, in some embodiments, be determined based on the received access request. For instance, logical data block addresses included in the received access requests may be used to deterministically calculate or identify the data block object identifiers or cached block entry identifiers. In some embodiments, the logical data block address may be used as the identifier for the cached data block entry and/or the data block object in the object data store.

Once the translated access requests are generated, they may be sent to their respective destinations, the non-relational database and/or the object data store, as indicated at 730. In some embodiments, the translated access requests may include a request for an acknowledgment or a particular type of acknowledgement. In this way, it may be determined whether the translated access requests successfully completed at the non-relational database and/or the object data store, as indicated at 740. For example acknowledgments may be received that indicate success or failure, include various types of data from requested data for the data block or information indicating the storage location of the data block, the identity corresponding to the data block in the non-relational database or object data store, or other request status or error information. The determination as to whether translated access requests have completed successfully may be made after a certain period of time. For instance, the network-based storage protocol may include specifications, guarantees, or other provisions that stipulate response times for access requests. The amount of time before a determination as to whether a translated access requests is successful or not may be based on these specified times for the network-based storage protocol. In some embodiments, the amount of time prior to determining the success/failure of translated access requests may be determined according to the timing guarantees or specifications of the non-relational database and/or the object data store.

If at least one of the translated access requests completes successfully, then a response may be sent to the client indicating completion of the access request, as indicated at 750, which may be formatted according to the network-based storage protocol, in various embodiments. For example, it may be determined that a write request successfully completed at the non-relational database system, and thus an acknowledgement of the write request received at the storage protocol target from the client may be sent back to the client. If, for example a read request is successful, then the data block may be returned. If, however, no translated access requests complete successfully, as indicated by the negative exit from 740, then a failure response may be sent to the client formatted according to the network-based storage protocol, as indicated at 760. The failure response may indicate errors or other status information. In some embodiments, the storage protocol target may retry sending the translated access requests or wait before sending the failure response a certain period of time (so that any responses or acknowledgments from the non-relational database system or object data store may have more time to be received). Discussion of FIGS. 9 and 10 below provide further information for determining when particular access requests are successfully completed, in some embodiments.

In various embodiments, access requests may be processed as indicated at elements 710 through 760 in such a manner as to be Portable Operating System Interface (POSIX) compliant.

Figure 8:
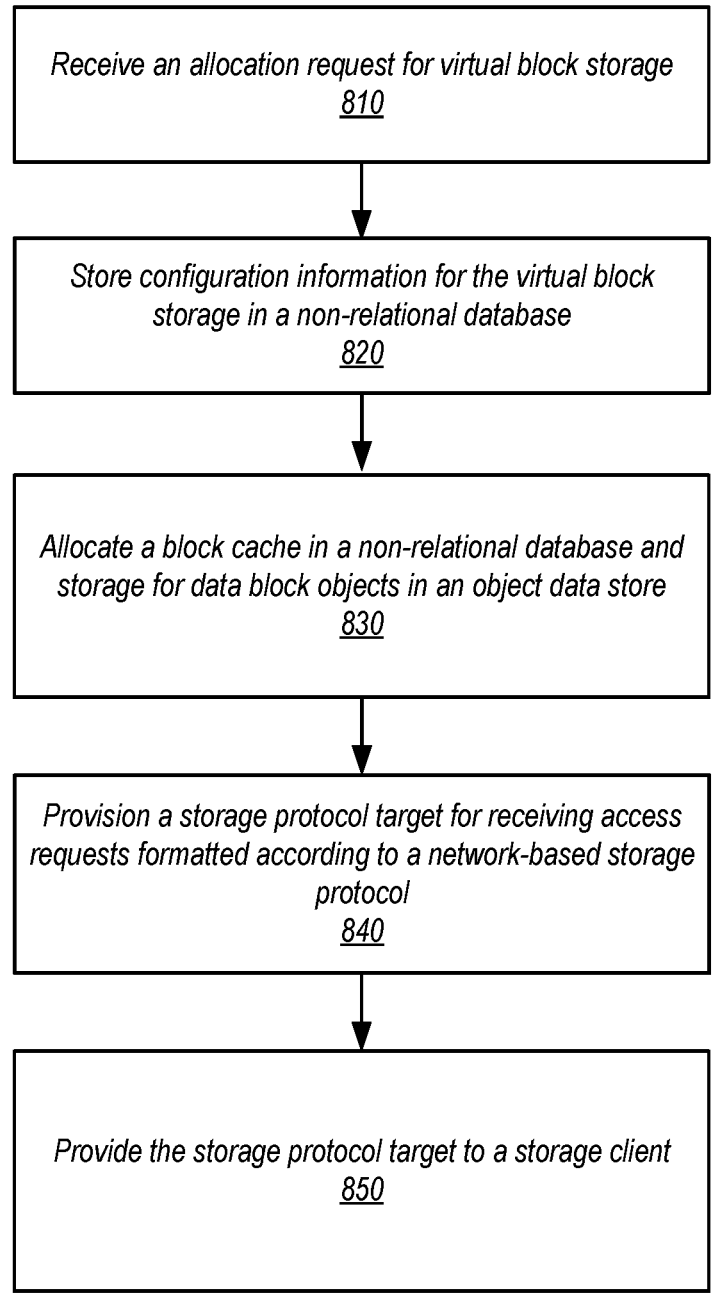
FIG. 8 is a high-level flowchart for illustrating methods and techniques for allocating virtual block storage in object-backed block-based distributed storage, according to some embodiments.

Virtual block storage may be object-backed, as discussed above. Thus, an object data store may provide storage for data blocks in the object data store. A non-relational database may also provide a block cache for the block storage, so that updates to data blocks in the virtual block storage may be quickly stored in cached block entries. Therefore, implementing object-backed, block-based distributed storage may involve configuring the non-relational database and the object data store. For instance, as illustrated above with regard to FIG. 4, object-backed block-based storage may be implemented in a service architecture which may be interacted with programmatically. FIG. 8 is a high-level flowchart for illustrating methods and techniques for allocating virtual block storage in object-backed block-based distributed storage, according to some embodiments.

In some embodiments, an allocation request may be received for virtual block storage, as indicated at 810. The allocation request may be received at a control plane, front end module, or other object-backed block-based distributed storage component that is configured to handle allocation requests. The allocation request may indicate a particular amount of block storage. For example, the storage request may indicate a total size of the virtual block storage (e.g., 10 terabytes) or number of data blocks (e.g., 2,000,000,000 data blocks). The virtual block storage may be logically treated as a single logical object or data volume comprising the requested number of blocks or equaling the requested total size. The allocation request may also indicate a format or size for individual data blocks (e.g., 512 bytes or 1024 bytes). The allocation request may also further indicate size or proportion of data blocks to be maintained as cached block entries in the block cache in the non-relational database versus as data block objects in the object data store. The allocation request may, in some embodiments, be formatted according to a programmatic interface (API) for the object-backed block-based distributed storage.

In response to receiving the request, configuration information for the virtual block storage may store configuration information for the virtual block storage in a non-relational database, as indicated at 820, in some embodiments. For instance, the size, format, caching scheme or other information in the allocation request may be stored in the configuration information. Other information, such as mapping information or information for identifying the current location of a data block may be configured, as well as other metadata describing the data blocks or the virtual block storage as a whole (e.g., last time a data block was accessed, changed). The configuration information may be stored in a same or separate table as a block cache. In various embodiments, a block cache may be allocated in a non-relational database and storage space for data block objects may be allocated or created in an object data store, as indicated at 830. For example, a table creation request may be sent to the non-relational database to create a block cache table for the virtual block storage. The request may specify a particular size for the table, or may not specify the size as the table may be scalable. In some embodiments, the request may specific a particular throughput or workload desired for the database table. Similarly, one or more creation requests may be sent to the object data store to allocate storage space, such as establishing an account, container, or other space associated with the virtual block storage. The allocated storage space may be empty, or filled with metadata, or other objects describing the virtual block storage. In some embodiments, individual data objects may be created which may correspond to the data blocks in the virtual block storage. Data block objects may be created as to store the amount of data in a data block, which may be specified in the allocation request (e.g., data block size like 512 bytes or 1024 bytes). These requests may be formatted according to programmatic interface (API) for the object-backed block-based distributed storage.

In at least some embodiments, a storage protocol target may be provisioned for receiving and processing access request for the virtual block storage that are formatted according to a network-based storage protocol, as indicated at 840. A storage protocol target may be one or more physical computing devices, virtual computing instances, or other nodes (such as are described below with regard to computer system 2000 in FIG. 12) which may be configured to perform as a storage protocol target. In some embodiments, storage protocol targets may be implemented as stateless components such that in the event of a power loss or other failure of the storage protocol target, the storage protocol target may be able to recover and resume processing access requests without determining a state of the storage protocol target prior to the failure. For example, in various embodiments a newly provisioned protocol storage target or a storage protocol target recovering from a failure may obtain configuration information for the virtual block storage (which may be stored in the non-relational database or other system including the object data store or another component of the object-backed block-based distributed storage). This configuration information may include any identification information for the virtual block storage to be configured to process requests directed to the specific virtual block storage (as other virtual block storage may be allocated and provided for other storage clients). The configuration information may include mapping or other information about the location, format, status, or other metadata concerning the virtual block storage as maintained in the non-relational database and the object data store.

As indicated at 850, the storage protocol target may be provided to a storage client. This storage client may be a storage client that requested the allocation of the virtual block storage or a different storage client. In some embodiments, a network address or other identifier may be provided to indicate the storage protocol target. In at least some embodiments, individual storage protocol targets may be implemented by multiple nodes configured to perform as a storage protocol target for virtual block storage. For instance, one access request may be sent to one node implementing the storage protocol target while a subsequent access request may be sent to a different node implementing the same storage protocol target. Load balancing techniques may be implemented, in some embodiments, to spread access requests efficiently or optimally across multiple nodes as the storage protocol target. Thus, the storage protocol target provided to a storage client may be an endpoint which receives access requests and dynamically distributes them among the nodes implementing the storage protocol target. If, for instance a data center implementing a particular node of the storage protocol target is down, then the access request may be directed to a node implementing the storage protocol target in another data center that is available.

Figure 9:
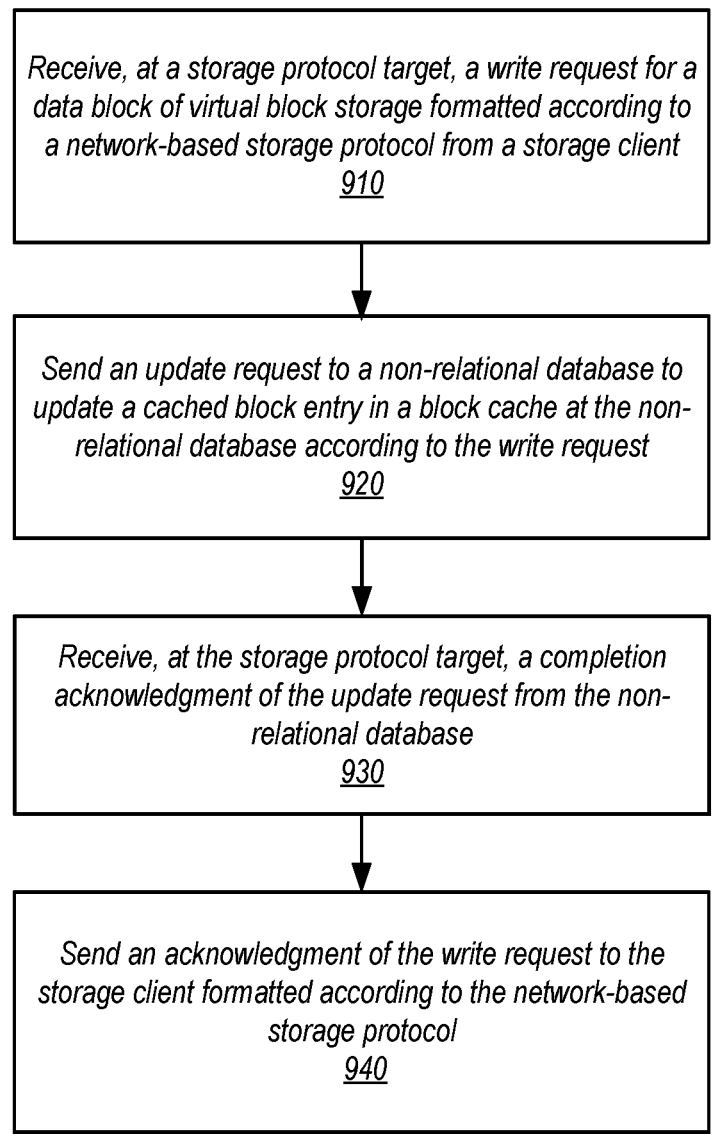
FIG. 9 is a high-level flowchart for illustrating methods and techniques for processing write requests for virtual block storage at object-backed block-based distributed storage, according to some embodiments.

One type of access request for virtual block storage may be a write request to change, add, update, or otherwise modify the data stored in a data block in virtual block storage. FIG. 9 is a high-level flowchart for illustrating methods and techniques for processing write requests for virtual block storage at object-backed block-based distributed storage, according to some embodiments. As indicated at 910, a write request for a data block may be received at a storage protocol target that is formatted according to a network-based storage protocol that is from a storage client. As discussed above with regard to FIG. 7, the access request may include or indicate a particular data block (e.g., a logical block address) to be written as well as the data to be written to the data block.

In various embodiments, an update request (or other similar request that creates, inserts, or modifies a cached block entry) may be sent to update a cached block entry in a block cache maintained for the virtual block storage at a non-relational database according to the write request, as indicated at 920. The request may be formatted according to a programmatic interface (API) for the non-relational database. The data to be written to the cached block entry may be included or indicated in the update request. In some embodiments, encryption and/or compression techniques may be applied to the data when included in the request.

A completion acknowledgment the update request may be received from the non-relational database at the storage protocol target, as indicated at 930. In response to determining that the update request was completed, an acknowledgment of the write request may be sent to the storage client that is formatted according to the network-based storage protocol, as indicated at 940. The acknowledgment may indicate that the write request completed successfully and/or may be considered durable in the virtual block storage. Please note, however, that a failure at different ones of the elements, such as element 930, may be determined by the storage protocol target to be a failure of the write request, and an appropriate error/failure response formatted according to the network-based storage protocol may be sent to the storage client instead.

In at least some embodiments, an update request (or other similar request that creates, inserts, or modifies) may be additionally sent to the object data store when the update request is sent to the non-relational database, as indicated at 920. This additional update request may be directed to a data block object (or to create a data block object) that maintains the data block according to the write request. Once an acknowledgement from the object data store is received that indicates completion of the update, the cached block entry updated/created from the request to update the non-relational database at 920 may deleted or marked for deletion. A lookup table or mapping information may also be updated to indicate that the data block is stored in the data object in the object data store. In the event that an acknowledgement of completion of the update/creation of the data block in the object store is received prior to a completion acknowledgement from the non-relational database, the acknowledgment of the write request may be sent as discussed above with regard to element 940, in some embodiments.

Figure 10:
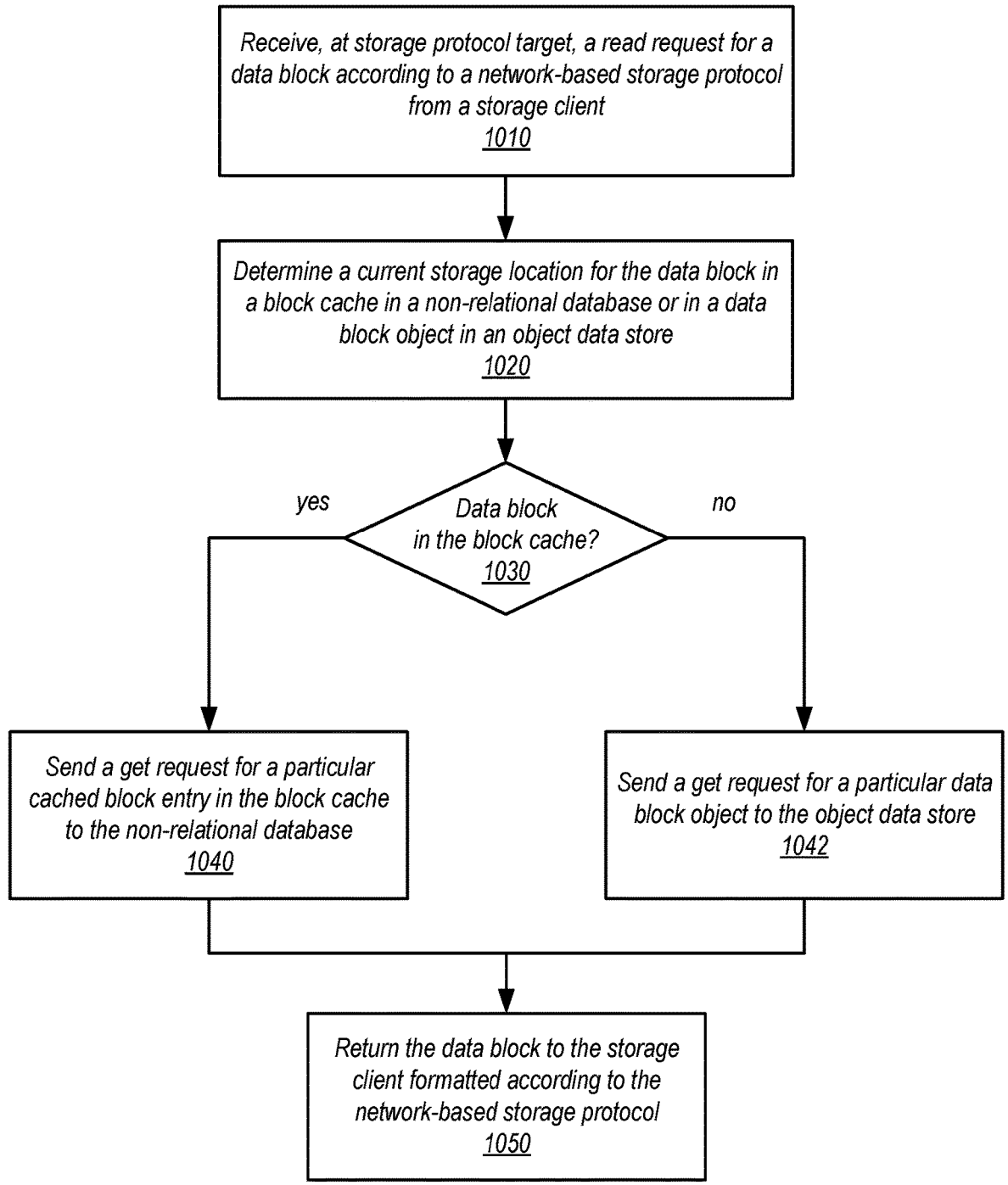
FIG. 10 is a high-level flowchart for illustrating methods and techniques for processing read requests for virtual block storage at object-backed block-based distributed storage, according to some embodiments.

One type of access request for virtual block storage may be a read request to obtain data stored in a data block. As data blocks in virtual block storage may be stored as cached block entries in the non-relational database and/or the object data store, access requests to read data blocks may have to determine storage locations and/or versions of data blocks to read. FIG. 10 is a high-level flowchart for illustrating methods and techniques for processing read requests for virtual block storage at object-backed block-based distributed storage, according to some embodiments. As indicated at 1010, a read request for a data block may be received at a storage protocol target that is formatted according to a network-based storage protocol that is from a storage client. As discussed above with regard to FIG. 7, the access request may include or indicate a particular data block (e.g., a logical block address) to be read.

A storage location for the data block may be determined in a block cache in a non-relational database or in a data block object in an object data store, as indicated at 1020. For example, in some embodiments, a lookup table or mapping information may be maintained, whether in the non-relational database or in another data store, such as the object data store. A query or request to scan or obtain the lookup data store for the data block may be performed. If, for instance, the data block is only stored in the object data store, then the lookup table may provide an indicator for the data block object storing the data block (e.g., a key value) which may be used to access data block object. Similarly, if the data block is stored in the non-relational database, then an item identifier (e.g., a key value) may be indicated. However, the lookup table or mapping information may not provide an identifier for the data block object or the cached block entry. Thus, in some embodiments, a deterministic technique may be used to determine the identifier of the data block as may be maintained in the non-relational database or the object data store. Consider the example of a perfect hash function or other mapping algorithm which may be used to deterministically calculate an identifier for a given data block. A read request may be received and the data block address may be used as input into the deterministic hash function to provide an identifier that may be a key value for the data block object in the object data store or the cached block entry non-relational database. The lookup table or mapping information may, in some embodiments indicate the current location of the data block or the authoritative version to read from (if there is a conflict between the data block object and the cached block entry). In some embodiments, the block cache may store a bit mask or other indicator, such as an identifier (e.g., key, or attribute) formatted for the object data store.

Once the location is determined, if the data block is currently located in a cached block entry in the block cache, as indicated by the positive exit from 1030, then the data block may be requested from the non-relational database. A get or read request for the particular cached data block entry may be sent to the non-relational database, as indicated at 1040. Alternatively, if the particular data block is not located in the block cached, as indicated by the negative exit from 1030, then a get request for the particular data object may be sent to the object data store, as indicated at 1042, in various embodiments. A get or read request may be formatted according to programmatic interfaces (APIs) for the non-relational database or object data store respectively along with the indication of the cached block entry or data block object (such as may be indicated by a key value). The request may then be sent to the non-relational database and/or the object data store. As noted above, some data blocks may reside at a single location, either in a cached block entry in the non-relational database or in a data block object in the object data store. However, the data block may also reside at both the non-relational database and the object data store. Thus, (although not illustrated) read or get requests may be sent to both the non-relational database and the object data store asynchronously, where the first received response (which may typically, but not always, be the non-relational database) may be used to determine the value of the data block and/or success/failure of the read request. In some embodiments, a read or get request for the data block may always sent to both the non-relational database and the object data store (wherein element 1020 may not be performed). In such embodiments, an identifier for the cached block entry and the data block object may be determined according to the examples of deterministic examples above. If the values of the data block differ between the non-relational database and the object data store, then a default value may be selected as the value (e.g., cached block entry). In some embodiments, however, the lookup table or other mapping information may indicate the authoritative version of the data block, as noted above.

Once obtained, the data block may be returned to the storage client formatted according to the network-based storage protocol, as indicated at 1050. In some embodiments, encryption techniques and/or compression techniques may be used to return a compressed and/or encrypted form of the data block received from the non-relational database or the object data store to an uncompressed and/or unencrypted form. The return of the data block may provide an indication of the success of the read request. Please note, however, that a failure at different ones of the elements, such as element 1020 or failure to receive a response after elements 1040 or 1042, may be determined by the storage protocol target to be a failure of the read request, and an appropriate error/failure response formatted according to the network-based storage protocol may be sent to the storage client instead.

In some embodiments, a cache management scheme may be employed which stores a copy of the data block in a cached block entry in the non-relational database if the data block only resided in the object data store. For instance, if a read request is received and the data block is only maintained in a data block object in the object data store, once the data block is obtained from the data block object in the object data store, an update request may be sent to the non-relational data store to include the data block in cached block entry. Thus, if subsequent read requests for the data block are received, the non-relational database (which may have respond to read requests faster than the object data store) may also provide the data block to respond to the read request.

Figure 11:
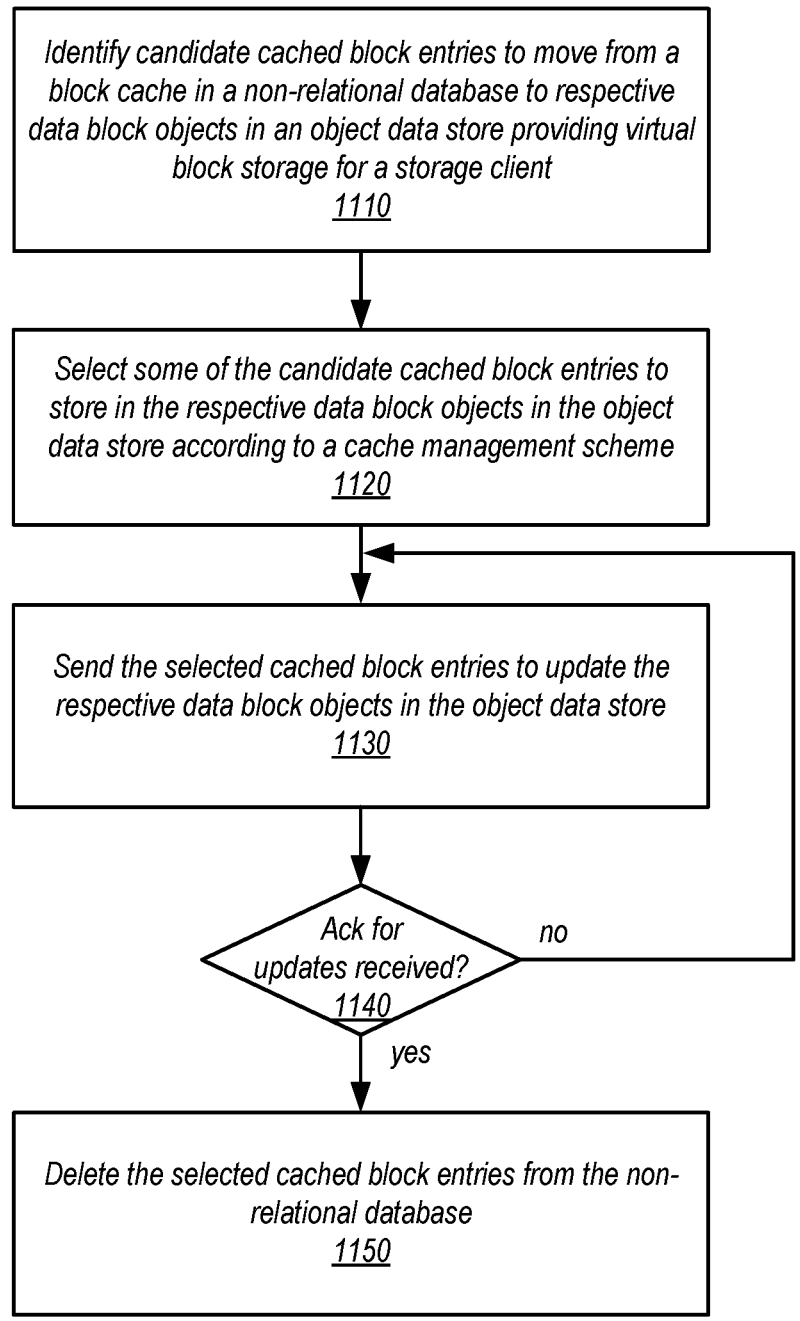
FIG. 11 is a high-level flowchart for illustrating methods and techniques for performing cache management operations for virtual block storage in object-backed block-based distributed storage, according to some embodiments.

Over time access operations, such as write operations, may increase the amount of data stored in the block cache in the non-relational database system. Storage costs for maintaining the block cache in the non-relational database may increase. Cache management operations, however, may be performed that intelligently control the data maintained in the block cache in order to leverage performance gains of implementing the block-cache in the non-relational database while minimizing the storage costs of maintaining the block cache. FIG. 11 is a high-level flowchart for illustrating methods and techniques for performing cache management operations for virtual block storage in object-backed block-based distributed storage, according to some embodiments.

Various components of object-backed block-based distributed storage may perform the described methods and techniques, such as block cache management agent(s) 340 described above with regard to FIG. 3.

As indicated at 1110, candidate cached block entries to move from a block cache in a non-relational database to respective data block objects in an object data store that provides virtual block storage for a storage client may be identified, in various embodiments. Queries, scans or other evaluations may be performed of various mapping information or metadata. For example, a request for block mapping information or lookup table may be sent to the non-relation database system (which may store this information along with the block cache, such as described above with regard to FIG. 3). The block mapping or lookup information may be returned and evaluated, in some embodiments, to identify those cached block entries that have not yet been moved from the block cache to their corresponding data block objects in the object data store. In another example, the non-relational database may be configured to allow for secondary indexes which would allow for specific query for cached block entries that have not been moved to be returned, in some embodiments. Each cached block entry item in the non-relational database may have a specific attribute which indicates whether or not the cached block entry has been moved to the object data store. A global secondary index may be created to include this attribute and, therefore, allowing queries for items with a particular value for this attribute to be easily performed.

However discovered, a selection may then be made from the candidate cached block entries according to a cache management scheme, as indicated at 1120. Cache management schemes may be implemented in many different ways. For example, a common cache management scheme may implement least recently used (LRU) to determine which cached block entries were last read or written to. First in first out (FIFO) is another example cache management scheme. In some embodiments, a fixed number of cached block entries may be enforced, which may determine the number of cached block entries that may be selected. Though, in some embodiments, the block cache for virtual storage may not be fixed at a certain size (as the table containing the cached block entries may itself be scalable to different sizes). Users, clients, or other entities that created, allocated, or maintain authority to control the virtual block storage may be able to define the cache management scheme, such as defining a particular size for the block cache (a number of cached block entries that are maintained in the non-relational database), or a particular technique to determine which cached block entries are to be selected for storage in the object data store.

In various embodiments, the selected cached block entries may be sent to update the respective data block objects in the object data store, as indicated at 1130. For instance, the data in the selected cached block entries may be obtained from the non-relational database (e.g., via a query) and included in one or more update requests to the object data store, which may be formatted according to a programmatic interface (API) for the data object store, to update, replace, or create respective data block objects in the object data store. If, for example, a data block object has not yet been created for a cached block entry, then a new data block object for the virtual block storage may be created with the data of the cached block entry. For existing data block objects, the data of the selected cached block entry may replace any existing data in the data block object.

Acknowledgements or responses to the requests to the object data store for the selected cached block entries may be received, indicating that the selected cached block entries have been stored in the data block objects. If acknowledgments for an update is received, as indicated by the positive exit from 1140, then the selected cached block entries may be deleted or removed (or marked or considered deleted or removed) from the non-relational database system, as indicated at 1150. In at least some embodiments, mapping information, a lookup table, or attributes of the items themselves may also be updated to indicate that the data block is stored in a data object in the object data store and not in a cached block entry in the non-relational database. If acknowledgments are not received, as indicated by the negative exit from 1140, then new requests may be sent to the object data store to store the selected block cached entries.

In various embodiments, some or all of the various steps of selecting cached block entries, sending update requests to the object data store, determining whether an acknowledgment is received, and deleting cached block entries may performed on an individual basis. For instance, if a group of requests to update different data block objects are sent, and an acknowledgment is received for one of the cached block entries, then that cached block entry may be deleted from the non-relational database though acknowledgements for the other cached block entries have not yet been received.

The methods described herein may in various embodiments be implemented by any combination of hardware and software. For example, in one embodiment, the methods may be implemented by a computer system (e.g., a computer system as in FIG. 12) that includes one or more processors executing program instructions stored on a computer-readable storage medium coupled to the processors. The program instructions may be configured to implement the functionality described herein (e.g., the functionality of various servers and other components that implement the database services/systems and/or storage services/systems described herein). The various methods as illustrated in the figures and described herein represent example embodiments of methods. The order of any method may be changed, and various elements may be added, reordered, combined, omitted, modified, etc.

Figure 12:
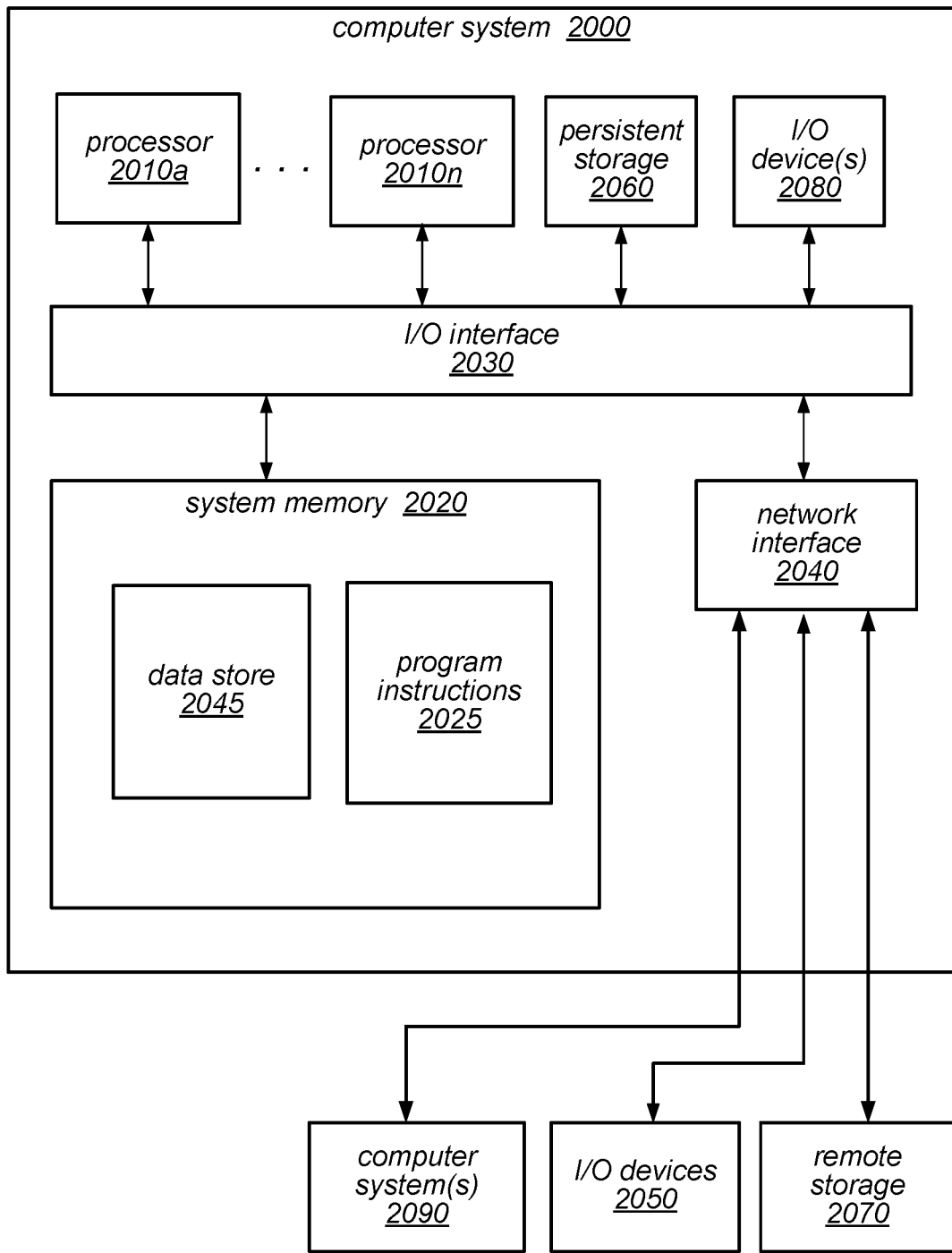
FIG. 12 is an example computer system, according to various embodiments.

FIG. 12 is a block diagram illustrating a computer system configured to implement at least a portion of the object-backed block storage systems described herein, according to various embodiments. For example, computer system 2000 may be configured to implement a storage protocol target, cache management agent, or one of a plurality of nodes or components of a non-relational database system or object storage system that are used to provide virtual block storage, in different embodiments. Computer system 2000 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 2000 includes one or more processors 2010 (any of which may include multiple cores, which may be single or multi-threaded) coupled to a system memory 2020 via an input/output (I/O) interface 2030. Computer system 2000 further includes a network interface 2040 coupled to I/O interface 2030. In various embodiments, computer system 2000 may be a uniprocessor system including one processor 2010, or a multiprocessor system including several processors 2010 (e.g., two, four, eight, or another suitable number). Processors 2010 may be any suitable processors capable of executing instructions. For example, in various embodiments, processors 2010 may be general-purpose or embedded processors implementing any of a variety of instruction set architectures (ISAs), such as the x86, PowerPC, SPARC, or MIPS ISAs, or any other suitable ISA. In multiprocessor systems, each of processors 2010 may commonly, but not necessarily, implement the same ISA. The computer system 2000 also includes one or more network communication devices (e.g., network interface 2040) for communicating with other systems and/or components over a communications network (e.g. Internet, LAN, etc.). For example, a client application executing on system 2000 may use network interface 2040 to communicate with a server application executing on a single server or on a cluster of servers that implement one or more of the components of the object-backed block-based storage system described herein. In another example, an instance of a server application executing on computer system 2000 may use network interface 2040 to communicate with other instances of the server application (or another server application) that may be implemented on other computer systems (e.g., computer systems 2090).

In the illustrated embodiment, computer system 2000 also includes one or more persistent storage devices 2060 and/or one or more I/O devices 2080. In various embodiments, persistent storage devices 2060 may correspond to disk drives, tape drives, solid state memory, other mass storage devices, or any other persistent storage device. Computer system 2000 (or a distributed application or operating system operating thereon) may store instructions and/or data in persistent storage devices 2060, as desired, and may retrieve the stored instruction and/or data as needed. For example, in some embodiments, computer system 2000 may host a storage system server node, and persistent storage 2060 may include the SSDs attached to that server node.

Computer system 2000 includes one or more system memories 2020 that are configured to store instructions and data accessible by processor(s) 2010. In various embodiments, system memories 2020 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 2020 may contain program instructions 2025 that are executable by processor(s) 2010 to implement the methods and techniques described herein. In various embodiments, program instructions 2025 may be encoded in platform native binary, any interpreted language such as Java™ byte-code, or in any other language such as C/C++, Java™, etc., or in any combination thereof. For example, in the illustrated embodiment, program instructions 2025 include program instructions executable to implement the functionality of a node implementing storage protocol target, cache management agent or other component of an object-backed block-based storage system, one of a plurality of nodes of a separate non-relational database system or object data store that store data on behalf of clients, in different embodiments. In some embodiments, program instructions 2025 may implement multiple separate clients, server nodes, and/or other components.

In some embodiments, program instructions 2025 may include instructions executable to implement an operating system (not shown), which may be any of various operating systems, such as UNIX, LINUX, Solaris™, MacOS™, Windows™, etc. Any or all of program instructions 2025 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 2000 via I/O interface 2030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 2000 as system memory 2020 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 2040.

In some embodiments, system memory 2020 may include data store 2045, which may be configured as described herein. For example, the information described herein as being stored by the non-relational database system or object data store may be stored in data store 2045 or in another portion of system memory 2020 on one or more nodes, in persistent storage 2060, and/or on one or more remote storage devices 2070, at different times and in various embodiments. Similarly, the information described herein as being stored may be stored in data store 2045 or in another portion of system memory 2020 on one or more nodes, in persistent storage 2060, and/or on one or more remote storage devices 2070, at different times and in various embodiments. In general, system memory 2020 (e.g., data store 2045 within system memory 2020), persistent storage 2060, and/or remote storage 2070 may store data blocks, replicas of data blocks, metadata associated with data blocks and/or their state, configuration information, and/or any other information usable in implementing the methods and techniques described herein.

In one embodiment, I/O interface 2030 may be configured to coordinate I/O traffic between processor 2010, system memory 2020 and any peripheral devices in the system, including through network interface 2040 or other peripheral interfaces. In some embodiments, I/O interface 2030 may perform any necessary protocol, timing or other data transformations to convert data signals from one component (e.g., system memory 2020) into a format suitable for use by another component (e.g., processor 2010). In some embodiments, I/O interface 2030 may include support for devices attached through various types of peripheral buses, such as a variant of the Peripheral Component Interconnect (PCI) bus standard or the Universal Serial Bus (USB) standard, for example. In some embodiments, the function of I/O interface 2030 may be split into two or more separate components, such as a north bridge and a south bridge, for example. Also, in some embodiments, some or all of the functionality of I/O interface 2030, such as an interface to system memory 2020, may be incorporated directly into processor 2010.

Network interface 2040 may be configured to allow data to be exchanged between computer system 2000 and other devices attached to a network, such as other computer systems 2090 (which may implement one or more nodes implementing storage protocol targets, cache management agents, object data store components, non-relational database components, and/or clients of the object-backed block-based storage systems described herein), for example. In addition, network interface 2040 may be configured to allow communication between computer system 2000 and various I/O devices 2050 and/or remote storage 2070. Input/output devices 2050 may, in some embodiments, include one or more display terminals, keyboards, keypads, touchpads, scanning devices, voice or optical recognition devices, or any other devices suitable for entering or retrieving data by one or more computer systems 2000. Multiple input/output devices 2050 may be present in computer system 2000 or may be distributed on various nodes of a distributed system that includes computer system 2000. In some embodiments, similar input/output devices may be separate from computer system 2000 and may interact with one or more nodes of a distributed system that includes computer system 2000 through a wired or wireless connection, such as over network interface 2040. Network interface 2040 may commonly support one or more wireless networking protocols (e.g., Wi-Fi/IEEE 802.11, or another wireless networking standard). However, in various embodiments, network interface 2040 may support communication via any suitable wired or wireless general data networks, such as other types of Ethernet networks, for example. Additionally, network interface 2040 may support communication via telecommunications/telephony networks such as analog voice networks or digital fiber communications networks, via storage area networks such as Fibre Channel SANs, or via any other suitable type of network and/or protocol. In various embodiments, computer system 2000 may include more, fewer, or different components than those illustrated in FIG. 12 (e.g., displays, video cards, audio cards, peripheral devices, other network interfaces such as an ATM interface, an Ethernet interface, a Frame Relay interface, etc.)

It is noted that any of the distributed system embodiments described herein, or any of their components, may be implemented as one or more network-based services. For example, a database engine head node within the database tier of a database system may present database services and/or other types of data storage services that employ the distributed storage systems described herein to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations. though In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the network-based service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A method, comprising:
performing, by one or more computing devices:
receiving, from a client, a read request for a particular data block in virtual block storage, wherein the read request is formatted according to a network-based storage protocol, wherein the virtual block storage is implemented using an object data store storing a plurality of data block objects for the virtual block storage and a non-relational database storing a block cache that includes a plurality of cached block entries for the virtual block storage; and
in response to receiving the read request:
generating a translated read request, comprising formatting the read request according to a programmatic interface for the non-relational database and sending, over a network, the translated read request to the non-relational database to get a particular cached block entry corresponding to the particular data block;
generating another translated read request comprising formatting the read request according to a programmatic interface for the object data store and sending, over the network, the other translated read request to the object data store to get a particular data block object corresponding to the particular data block; and
sending to the client a response to the read request formatted according to the network-based storage protocol, wherein the response includes a first one received of either the particular cached data block entry from the non-relational database or the particular data block object from the object data store.

2. The method of claim 1, further comprising:
identifying one or more of the plurality of cached data block entries to move to a respective one or more data block objects in the plurality of data block objects at the object data store;
selecting at least one of the identified cached data block entries according to a cache management scheme;
sending the at least one cached data block entry to update the respective data block object for the at least one cached data block entry; and
in response to determining that the respective data block object was updated, deleting the at least one cached data block entry from the non-relational database.

3. The method of claim 2, wherein the cache management scheme comprises user-defined size for the block cache, wherein the at least one identified cached block entry is selected in order to enforce the user-defined size of the block cache.

4. The method of claim 1, where said receiving the read request and said sending the translated read requests are performed in such a way as to be Portable Operating System Interface (POSIX) compliant.

5. The method of claim 1, further comprising:
receiving an allocation request for the virtual block storage from a storage client;
in response to receiving the allocation request:
allocating the block cache in the non-relational database and the plurality of data objects in the object data store;
provisioning a storage protocol target for receiving access requests for the virtual block storage; and
sending an identifier for the storage protocol target to the storage client such that the storage client may direct access requests formatted according to the network-based storage protocol to the storage protocol target.

6. A system, comprising:
a plurality of compute nodes, wherein individual ones of the compute nodes comprise a respective processor and respective memory, the compute nodes configured to implement an object-backed block-based storage service of a provider network that provides virtual block storage, comprising:
a multi-tenant object data storage service of the provider network, configured to store a plurality of data block objects for the virtual block storage;
a multi-tenant non-relational database service of the provider network, configured to store a plurality of cached block entries in a block cache for the virtual block storage; and
one or more storage protocol targets, each configured to:
receive, from a client, an access request for a particular data block, wherein the access request is formatted according to a network-based storage protocol;
in response to the receipt of the access request, generate translated access requests comprising:
a first translated access request for the non-relational database service in order to access a particular cached block entry corresponding to the particular data block; and
a second translated access request for the object data storage service in order to access a particular data block object corresponding to the particular data block;
wherein each of the translated access requests is formatted according to a respective programmatic interface for a respective one of the non-relational database service or the object data storage service;
send the first translated access request to the non-relational database service and the second translated access request to the object data storage service, via the provider network;
send to the client a response to the access request based at least in part on a response received from one of the non-relational database service or the object data storage service, wherein the response being sent to the client is formatted according to the network-based storage protocol.

7. The system of claim 6, wherein object-backed block-based storage service is configured to implement an Internet Small Computer Interface (iSCSI) as the network-based storage protocol.

8. The system of claim 6, wherein the access request is a write request directed to the particular data block,
wherein the translated access requests comprises an update request to update the cached data block entry for the particular data block maintained in the block cache non-relational database, and wherein to determine success or failure of the one or more translated access requests, the one or more storage protocol targets are configured to:
receive an acknowledgment of the update request from the non-relational database service indicating the success or failure of the update to complete.

9. The system of claim 6,
wherein the access request is a read request directed to the particular data block;
wherein in response to the receipt of the read request the one or more storage protocol targets are each further configured to determine a current storage location for the particular data block in the block cache of the non-relational database service or in the object data storage service;
wherein the translated access requests comprise a request to get the particular cached data block entry for the particular data block from the current storage location at the non-relational database service or a request to get the particular data block object for the particular data block from the object data storage service; and
wherein to send to the client the response to the access request formatted according to the network-based storage protocol, the one or more storage protocol targets are each configured to send the particular cached data block entry or the particular data block object.

10. The system of claim 9, where to send to the client the response to the read request, the one or more storage protocol targets are each configured to send a first one received of either the particular cached data block entry from the non-relational database service or the particular data block object from the object data storage service.

11. The system of claim 6, wherein the object-backed block-based storage service further comprises:
one or more cache management agents, configured to:
identify one or more of the plurality of cached data block entries to transfer to a respective one or more data block objects in the plurality of data block objects at the object data storage service;
select at least one of the identified cached data block entries according to a cache management scheme;
send the at least one cached data block entry to update the respective data block object for the at least one cached data block entry; and
in response to determining that the respective data block object was updated, delete the at least one cached data block entry from the non-relational database service.

12. One or more non-transitory, computer-readable storage media storing program instructions that when executed on or across one or more processors cause the one or more processors to perform:
receiving access requests for data blocks in virtual block storage, wherein the access requests are formatted according to network-based storage protocol, wherein the virtual block storage is implemented using an object data store storing a plurality of data block objects for the virtual block storage and a non-relational database storing a block cache that includes a plurality of cached block entries for the virtual block storage;

in response to receiving an access request for a particular data block from a first client:
  generating translated access requests, generating comprising:
    translating the access request according to a programmatic interface for the non-relational database to send to the non-relational database in order to access a particular cached block entry corresponding to the particular data block; and
    translating the access request according to a programmatic interface for the object data store to send to the object data store in order to access a particular data block object corresponding to the particular data block;
  sending the respective ones of translated access requests via a provider network to respective ones of the non-relational database and the object data store in order to perform the access request; and
  sending to the first client a response to the access request based at least in part on a response to the translated access requests that is received from one of the non-relational database or the object data store, wherein the response to the access request being sent to the first client is formatted according to the network-based storage protocol; and in response to receiving another access request for the particular data block from a second client:
  performing said generating the translated access requests for the other access request and said sending the translated access requests for the other access request; and
  sending to the second client a response to the other access request based on a response received from one of the non-relational database or the object data store, wherein the response being sent to the second client is formatted according to the network-based storage protocol.

13. The one or more non-transitory, computer-readable storage media of claim 12, wherein the access request is a write request directed to the particular data block, wherein the translated access requests comprise an update request to update the particular cached data block entry for the particular data block maintained at the non-relational database, and wherein the program instructions cause the one or more computing devices to perform:
  receiving an acknowledgment of the update request from the non-relational database indicating success or failure of the update.

14. The one or more non-transitory, computer-readable storage media of claim 12,
  wherein the access request is a read request directed to the particular data block;
  wherein in response to receiving the read request the program instructions cause the one or more processors to implement determining a current storage location for the particular data block in the block cache of the non-relational database or in the object data store;
  wherein the translated access requests comprise a request to get the particular cached data block entry for the particular data block from the current storage location at the non-relational database or a request to get the particular data block object for the particular data block from the object data store; and
  wherein in said sending to the client the response to the access request formatted according to the network-based storage protocol, the program instructions cause the one or more processors to implement sending the particular cached data block entry or the particular data block object.

15. The one or more non-transitory, computer-readable storage media of claim 14, wherein to send to the client the response to the access request, the program instructions cause the one or more processors to send a first one received of either the particular cached data block entry from the non-relational database or the particular data block object from the object data store.

16. The one or more non-transitory, computer-readable storage media of claim 12, wherein the program instructions cause the one or more processors to:
  identify one or more of the plurality of cached data block entries to move to a respective one or more data block objects in the plurality of data block objects in the object data store;
  select at least one of the identified cached data block entries according to a cache management scheme;
  send the at least one cached data block entry to update the respective data block object for the at least one cached data block entry; and
  in response to determining that the respective data block object was updated, delete the at least one cached data block entry from the non-relational database.

17. The one or more non-transitory, computer-readable storage media of claim 12, wherein a storage protocol target comprises a plurality of target nodes, and the program instructions cause the target nodes to perform said receiving the access request, said generating the one or more translated access requests, said sending the one or more translated access requests, and said sending to the client the response to the access request.

18. The one or more non-transitory, computer-readable storage media of claim 12, wherein the program instructions cause the one or more processors to, prior to generating the one or more translated access requests, determine that the access request from the client is authorized to access the particular data block.

19. The one or more non-transitory, computer-readable storage media of claim 12, wherein the program instructions cause the one or more processors to implement an Internet Small Computer Interface (iSCSI) as the network-based storage protocol.

20. The one or more non-transitory, computer-readable storage media of claim 12, wherein the program instructions cause the one or more processors to perform said receiving of the access request and said sending of the translated access requests in such a way that is Portable Operating System Interface (POSIX) compliant.

* * * * *